United States Patent [19]

Lynnworth

[11] 4,336,719
[45] Jun. 29, 1982

[54] ULTRASONIC FLOWMETERS USING WAVEGUIDE ANTENNAS

[75] Inventor: Lawrence C. Lynnworth, Waltham, Mass.

[73] Assignee: Panametrics, Inc., Waltham, Mass.

[21] Appl. No.: 168,325

[22] Filed: Jul. 11, 1980

[51] Int. Cl.³ ............................................. G01F 1/66
[52] U.S. Cl. ............................... 73/861.27; 73/861.31
[58] Field of Search ............ 73/861.27, 861.28, 861.29, 73/861.31

[56] References Cited

U.S. PATENT DOCUMENTS

| | | | |
|---|---|---|---|
| 1,471,547 | 10/1923 | Chilowsky et al. | |
| 2,651,012 | 9/1952 | Van Valkenburg | 318/116 |
| 2,667,780 | 2/1954 | Van Valkenburg | 73/67 |
| 2,746,291 | 5/1956 | Swengel | 73/194 |
| 2,787,160 | 4/1957 | Van Valkenburg | 73/290 |
| 3,477,278 | 11/1969 | Lynnworth | 73/53 |
| 3,564,912 | 2/1971 | Malone et al. | 73/194 |
| 3,680,375 | 8/1972 | Joy et al. | 73/194 |
| 3,817,098 | 6/1974 | Brown | 73/861.28 |
| 4,103,551 | 8/1978 | Lynnworth | 73/194 |
| 4,193,291 | 3/1980 | Lynnworth | 73/32 |

OTHER PUBLICATIONS

Mason & Thurston, Eds., *Physical Acoustics*, vol. 14, Chapter 5, pp. 407–525, Academic Press (1979).
"Liquid Level Measurements . . . ," Ultrasonic Symposium Proceedings, IEEE Cat N. 79 CH 1482–1489, pp. 376–379.
"Slow Torsional Wave Sensors," 1977 Ultrasonic Symposium Proceedings, IEEE Cat. N. 77 CH 1264–ISU.
Schmidt & Tilmann, J. Acoust. Soc. Amer., 47(5) Part 2, pp. 1310–1324 (May 1970).
IEEE Tranactions Sonics and Ultrasonics, SI-20, p. 274–278, Sunthankar (1973).
Schlichting, Boundary-Layer Theory, 6th Ed. (1968), p. 564.
Techniques for Mounting an Ultrasonic Temperature Device, Lynnworth & Carnevale, NASA CR-54979, Feb. 1966, FIGS. 37, 38, and 39 only.
Ultrasonics, 18(11) pp. 6–7, Jan. 1980.

*Primary Examiner*—Herbert Goldstein
*Attorney, Agent, or Firm*—Kenway & Jenney

[57] ABSTRACT

Waveguide antennas for ultrasonic flowmeters are described in which at least one pair of antennas is used to interrogate a flowing fluid. The waveguides are parallel, each pair defining a plane of interrogation which is parallel or nearly parallel to the flow.

Some preferred embodiments use elongated waveguides which effectively interrogate the flow simultaneously along a sufficiently large number of parallel paths so that non-axial components of flow tend to be cancelled. Non-axial components are thereby suppressed or eliminated as significant error sources. The large number of effective paths, over a distributed planar area, also contributes to reliable operation even when the fluid is not single phase, especially if interrogating wavelengths are used which are large compared to scatterer dimensions. Several configurations are disclosed wherein the waveguides or their shields may be maintained clean and free of deposits without interrupting their use in the measurement of flow. In some cases a pair of waveguides may be used to measure not only flow velocity but also other fluid parameters of interest such as liquid level, density, impedance or temperature.

44 Claims, 74 Drawing Figures

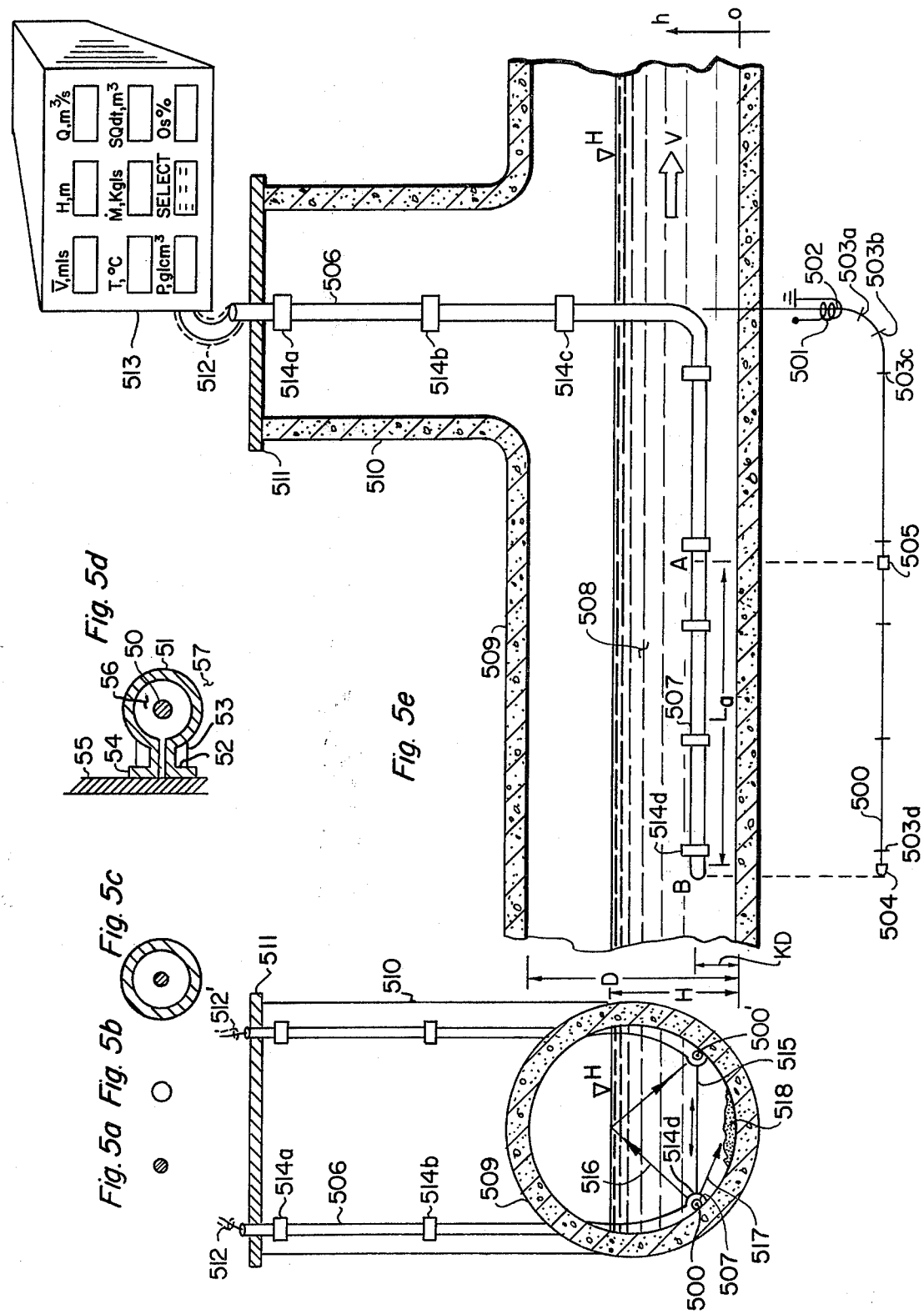

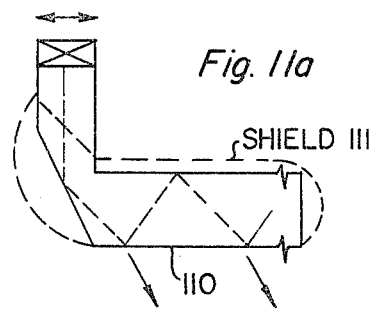
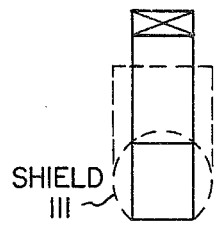
Fig. 11a   Fig. 11b
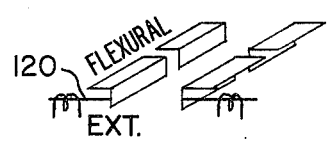
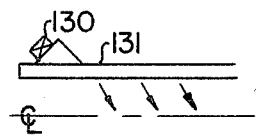
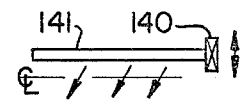
Fig. 12   Fig. 13   Fig. 14
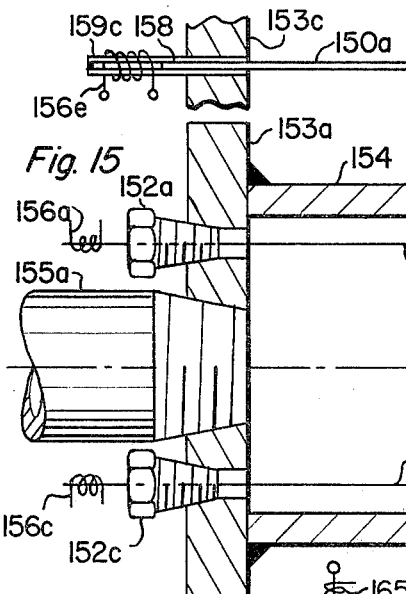
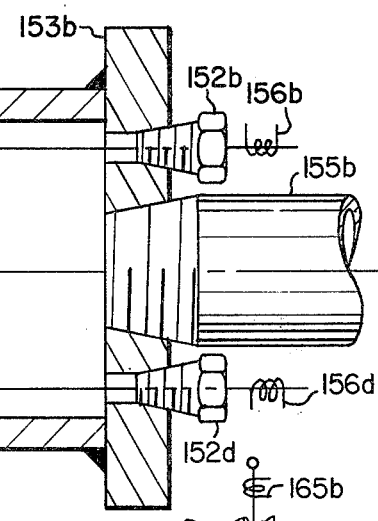
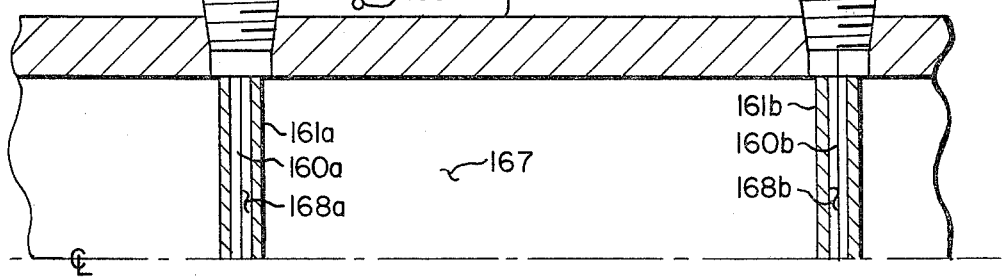
Fig. 15
Fig. 16

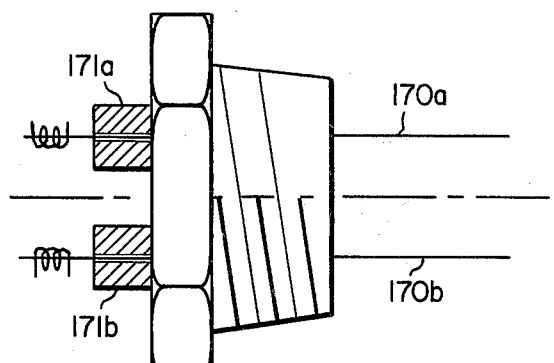
Fig. 17a
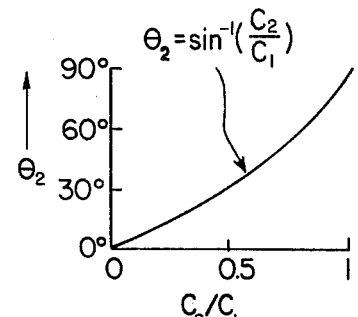
Fig. 18a
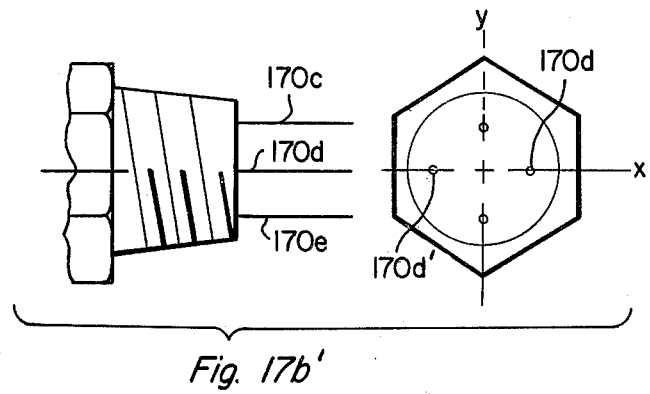
Fig. 17b'
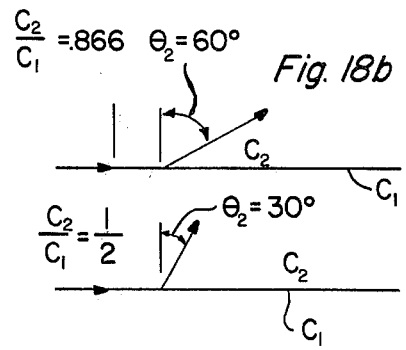
Fig. 18b
Fig. 18c
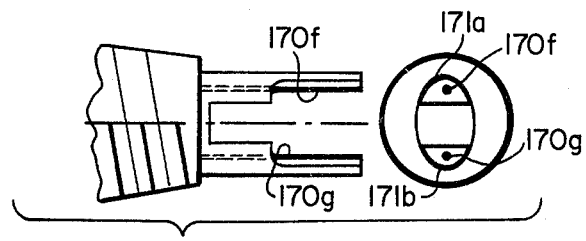
Fig. 17c
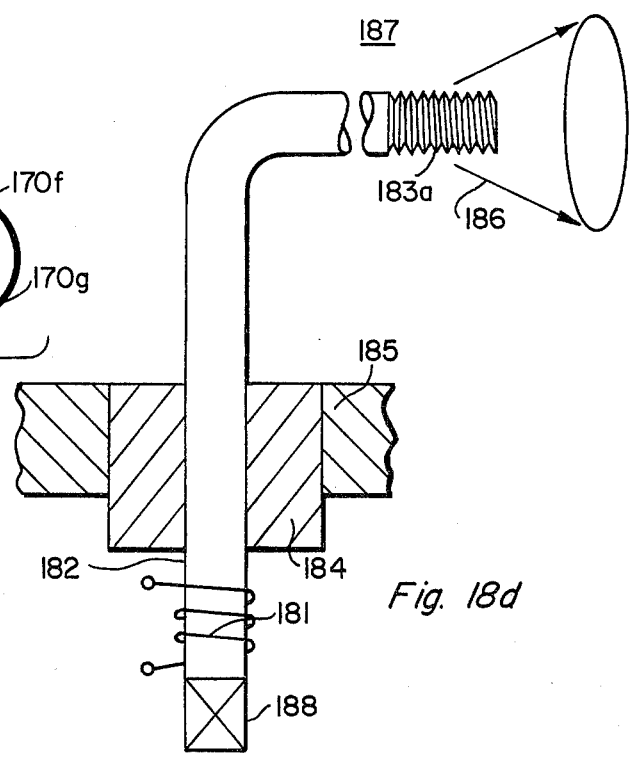
Fig. 18d

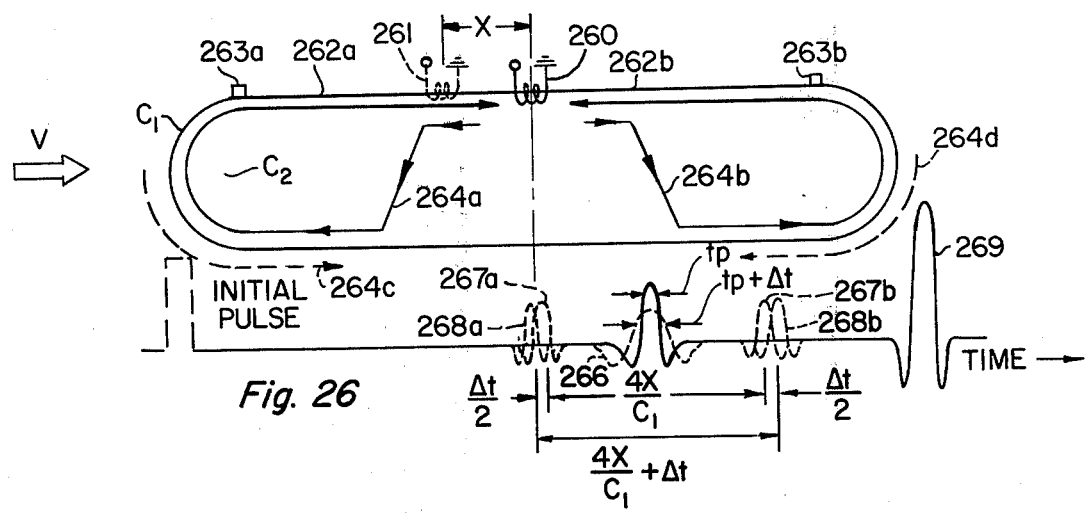
Fig. 26
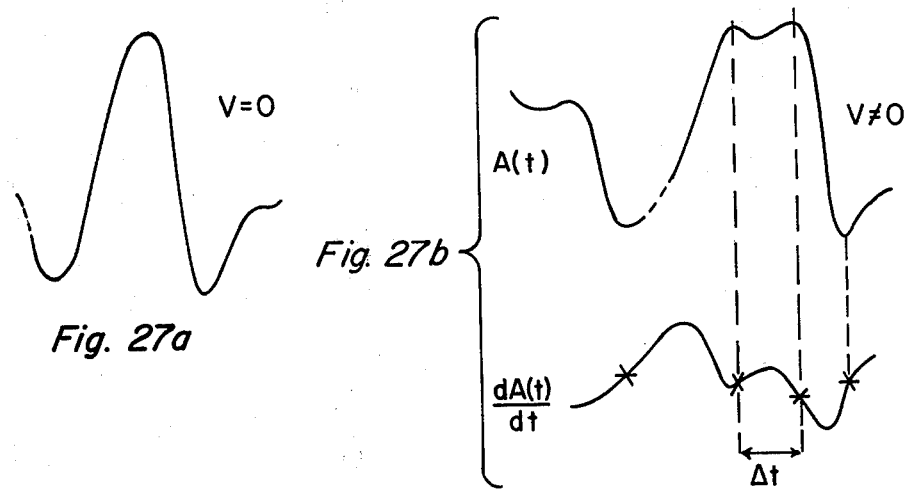
Fig. 27a
Fig. 27b
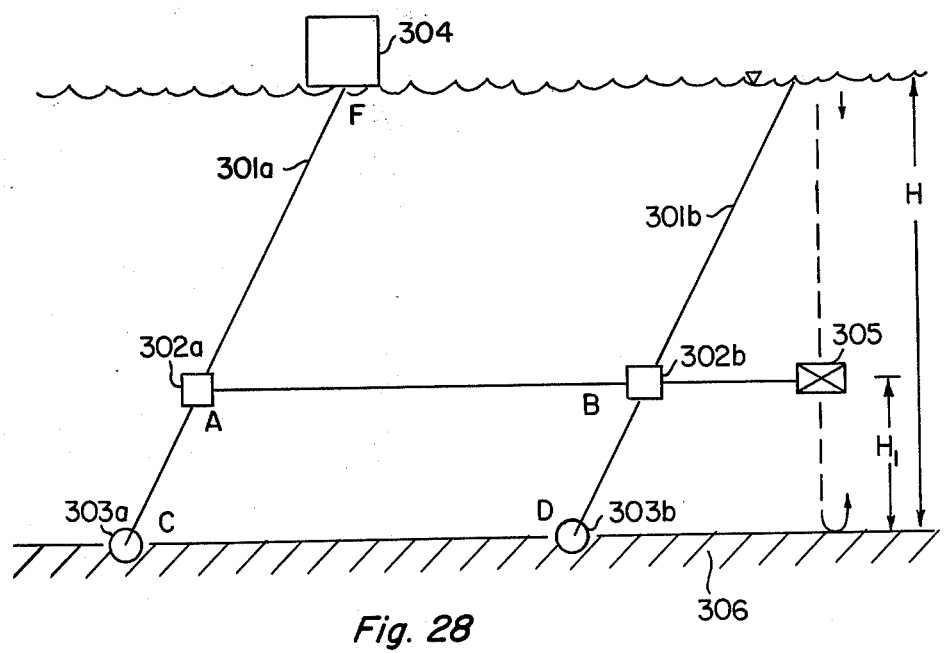
Fig. 28

ULTRASONIC FLOWMETERS USING WAVEGUIDE ANTENNAS

BACKGROUND OF THE INVENTION

This invention relates to ultrasonic flowmeters and more particularly to such flowmeters employing waveguide antennas to interrogate a moving fluid.

The history of ultrasonic flowmeters is reviewed by the applicant in Chapter 5, pages 407–525 in the book Physical Acoustics—Vol. 14, edited by Mason and Thurston and published by Academic Press (1979). The origins of some of the most common ultrasonic flowmeters in use today, such as the doppler and the contrapropagating transmission (upstream-downstream) methods are traceable to early patents such as those of Chilowsky and Langevin (1923) U.S. Pat. No. 1,471,547 and Rütten (1928-1931) German Pat. No. 520,484, respectively. These and subsequent investigators used two or more transducers, generally piezoelectric types, to launch and detect ultrasonic waves the velocity or frequency of which was modified by interaction with the flowing fluid. Transducer arrays were used by Chilowsky and Langevin and subsequently by Swengel (1956) as described in U.S. Pat. No. 2,746,291. Swengel also used a pair of parallel waveguides to interrogate water in large rectangular ducts over a sheetlike path oriented obliquely to the flow. Raptis et al. in the 1978 IEEE Ultrasonics Symp. Proc., pp. 291–295 utilized the zigzagging SV shear wave (vertically polarized) in a pipe wall to act as an extended source for doppler interrogation of liquid flow. However, this "simulated array" is not classed as a waveguide mode antenna because the pipe wall bounds the wave in the radial direction only, but does not bound the wave in the circumferential direction. For the purposes of this invention, the term waveguide shall mean an elongated structure in which one or more wave modes are substantially confined by means of structural boundaries forming a closed surface surrounding the principal waveguide axis of propagation. The closed surface may have a circular or noncircular cross section and the waveguide itself may be solid or hollow. The ultrasonic wave will usually or generally fill substantially the entire solid portion of the waveguide.

Very few investigators other than Swengel have used waveguides as antennas. Sunthankar (1973) IEEE Trans. Sonics and Ultrasonics SU-20 274-278 used a ribbon-like structure excited into flexural vibration as an ultrasonic radiator. Sunthankar used strain gages to excite the radiator; Swengel used piezoelectric crystals at the undamped end of each of his waveguides. Swengel disclosed transducers attached at opposite ends of parallel waveguides, and waveguides tilted with respect to flow direction to compensate for the oblique launching of waves in the water from the traveling wave in the waveguide.

Prior art buffer rods or waveguides used in ultrasonic flowmeters include the SV mode ultrasonic wave as described by the applicant in U.S. Pat. No. 3,477,278 (1969). In that patent transmission occurred substantially at the beveled ends, leading to fluid interrogation along a solid cylindrical (non-sheet-like) path.

There are several disadvantages with known prior art ultrasonic flowmeters. First of all, the known flowmeters are expensive and usually must operate at temperatures below the transducer's curie point. Additionally, the accuracy of known flowmeters is degraded when measuring the velocity of a multiphase liquid such as a slurry with entrained air, or a fluid which tends to deposit residues on conventional transducers. In Swengel's flowmeter, the transducers for launching or detecting waves were separate from the waveguide antennas themselves giving rise to bonding problems between the transducer and waveguide. Another disadvantage of prior art flowmeters was the need to transpose electrically the launching and detecting transducers to interrogate the fluid in the upstream and downstream directions.

It is an object of this invention, therefore, to provide an ultrasonic flowmeter using waveguide antennas which is inexpensive and reliable and which maintains its accuracy at high temperatures and in the presence of multiphase fluids and liquids which tend to deposit residues on the waveguide antenna.

It is a further object to provide such a flowmeter which substantially eliminates errors resulting from non-axial flow components.

Yet another object is a flowmeter using waveguide antennas for contrapropagating interrogation which does not require transposing the launching and detecting transducers.

Another object is to provide apparatus for measuring a fluid's characteristic impedance or its mass or volumetric flow rate.

Other objects, features and advantages of the invention will be pointed out hereinafter.

SUMMARY OF THE INVENTION

The ultrasonic flowmeter for measuring the velocity of a fluid according to this invention features at least one pair of spaced apart, parallel, elongated waveguide antennas adapted for propagating ultrasonic waves and immersed in the fluid so that the plane defined by the parallel antennas is substantially aligned with the velocity vector of the fluid. A first transducer is provided for launching an ultrasonic wave at a first time along one of the waveguide antennas for transmission through the fluid. A second transducer is provided for detecting at a second time the ultrasonic wave received in the other waveguide antenna after the wave has travelled through the fluid. Processing apparatus can operate on the first and second times to compute the velocity of the fluid.

In a preferred embodiment the first and second transducers are adapted both for launching and detecting the ultrasonic waves. In this embodiment, the fluid is interrogated both in the upstream and downstream directions by transposing the functions of the first and second transducers. The waveguide antennas are of substantially identical length.

In another important embodiment the waveguide antennas are of different lengths so that upstream and downstream interrogations of the fluid can be performed without transposing the functions of the first and second transducers. In this embodiment, the transducers are located at the same ends of the two waveguide antennas and are integral therewith creating a monolithic antenna-transducer structure.

The embodiments of the invention disclosed herein may be used with several different kinds of ultrasonic waves. A summary of wave types, dispersive character and typical frequency range relevant to this invention is given in Table 1.

TABLE 1

List of wave types, frequencies and dispersive character.
($d_\omega$ = waveguide diameter.)

| Wave type | Type frequency range | Dispersive or Nondispersive |
| --- | --- | --- |
| Extensional | 50-150 kHz | Nond. |
| Torsional | 50-150 kHz | Nond. |
| Flexural | 20-200 kHz | Disp. |
| Lamb | 1-10 MHz | Disp. |
| Rayleigh (surface) | 1-10 MHz | Nond. |
| Longitudinal | 1-10 MHz | Disp. if $0.3\lambda \lesssim d_\omega < 3\lambda$ |
| Shear | 1-10 MHz | Nond. |

The illustrated waveguide configurations are adaptable to a variety of flowmeter electronic measuring approaches and several different types of physical interaction between wave and fluid, e.g., contrapropagating transmission, doppler, and vortex shedding. Electronic approaches include the use of broadband pulses for waveguides which are substantially nondispersive over the pulse's bandwidth, and the use of narrowband waves or narrowband (tone burst) pulses for waveguides in which dispersive modes propagate, e.g., Lamb waves or flexural waves.

BRIEF DESCRIPTION OF THE DRAWINGS

The invention disclosed herein will be more completely understood with reference to the following drawings of which:

FIG. 1 also illustrates a representative signal.

FIG. 2 also illustrates a representative signal.

FIG. 3 also illustrates representative signals.

FIG. 4a' illustrates diameter antennas communicating over axial paths;

FIG. 4c' shows waveguide antennas installed along mid-radius chords;

FIG. 4d' shows antennas located at Gaussian distances;

FIG. 4f' illustrates an arbitrary conduit boundary in which the flow is sampled at many locations by pairs of chord located antennas in a plane parallel to one another and to the flow.

FIG. 5a shows the cross-section of a solid rod antenna;

FIG. 5b shows a hollow tube waveguide antenna;

FIG. 5c shows a solid rod surrounded by a concentric tubular shield or sheet;

FIG. 5d shows a solid rod surrounded by an omega-shaped shield;

FIG. 5e represents the use of waveguide antennas to measure fluid and flow related parameters in a partly filled conduit.

FIG. 9b is a top view of the open channel of FIG. 9a;

FIG. 9c is a graph of liquid height versus flow profile.

FIG. 10b illustrates the use of two of the waveguide antennas illustrated in FIG. 10a;

FIG. 10c illustrates the three-dimensional use of the waveguide antenna of FIG. 10a.

FIG. 11a shows a waveguide similar to that of FIG. 10 but shielded except for one immersed surface. FIG. 11b is an end view of the shielded waveguide antenna of FIG. 11a.

FIG. 12 shows a pair of stiffened waveguides used in an acoustic mode converting system wherein the magnetostrictive transducers operate in the extensional mode, the waveguide antennas operate in the flexural mode, and the wave transmitted over the intervening fluid is longitudinal.

FIG. 13 shows a strip waveguide which supports a Lamb wave which may launch longitudinal waves into the fluid adjacent its wetted surface.

FIG. 14 shows an antenna similar to that of FIG. 13 except the strip supports transverse shear waves.

FIG. 15 shows antennas mounted in a spoolpiece.

FIG. 16 shows a pair of antennas with electrically heated shields.

FIG. 17a shows relatively short probe-like antennas installed in pipe plugs.

FIG. 17b' shows four of the probe-like antennas installed in a pipe plug;

FIG. 17c shows a pair of waveguide antennas which are partially shielded.

FIG. 18a contains a graph corresponding to Snell's Law, and contains corresponding illustrations of rays refracted at 60° and 30° from a smooth-surfaced round rod antenna, and also contains an illustration of radiation substantially normal to the surface of a threaded rod in which ultrasonic waves are propagating.

FIG. 18b illustrates a ray refracted at 60° from a smooth surfaced waveguide antenna;

FIG. 18c shows a ray refracted at a 30° angle;

FIG. 18d shows a magnetostrictive transducer penetrating a pipe wall through a sealed compression fitting.

FIG. 19b is a top view of the antennas illustrated in FIG. 19a.

FIG. 26 illustrates a pair of waveguide antennas joined at their ends to form a continuous loop.

FIG. 27a and FIG. 27b are a graphical representation of a signal processing technique employing time differentiation.

FIG. 28 illustrates apparatus for measuring flow in partly filled conduits or in open channels.

DESCRIPTION OF PREFERRED EMBODIMENTS

Figure 1:
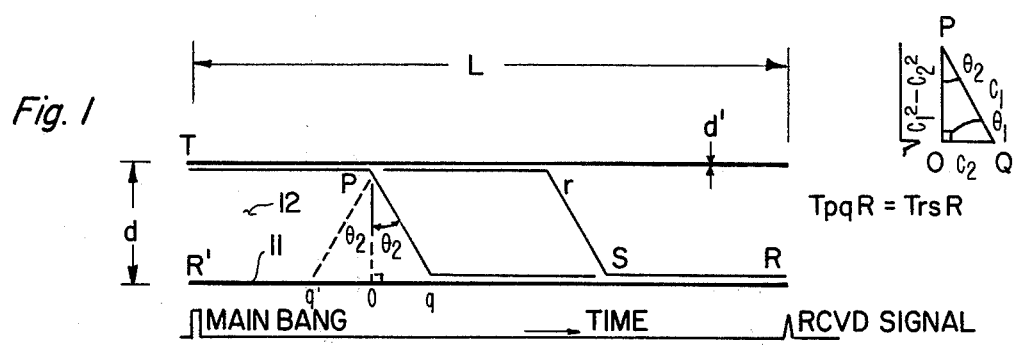
FIG. 1 is a representation of a pair of identical parallel antenna waveguides immersed in a fluid medium, and including an arbitrarily-located pair of fluid-borne paths.

Referring now to FIG. 1, it is seen that two parallel identical waveguides 10 and 11 of length L are spaced a distance d apart. For simplicity of explanation it is assumed that the waveguides are straight solid rods of circular cross section and of diameter d' less than one fifth of the extensional mode wavelength which propagates in them. The rods are immersed in a fluid 12. Support apparatus and transducer details will be introduced in subsequent figures. An ultrasonic extensional mode transducer introduces a short pulse, e.g., $\sim 15\mu s$ duration, at a transmitter location T, and an identical receiver transducer is located at R. Because of the Poisson effect, as the extensional pulse propagates along the waveguide 10, it radiates a cone of rays into the fluid 12. Two such rays are shown, following paths pq and rs. The pulse or wave in the waveguide 10 may be thought of as providing an angle of incidence $\theta = 90°$. The refracted angle $\theta_2$ equals $\sin^{-1}(c_2/c_1)$, where $c_1$ is the extensional wave velocity in the immersed waveguide 10 and $c_2$ is the longitudinal wave velocity in the fluid medium 12. The paths TpqR and TrsR are equal, and further, the travel times from T to R along either path are identical. Therefore, disregarding multiple transits or indirect paths that may exist in a bounded system (e.g., pipe installation) when a pulse is introduced at T, as the pulse propagates along rod 10, portions of the small amounts of energy which leak off are received coherently (in phase) at R. This is symbolized by the time diagram beneath the waveguides. It can be shown that the time of travel from T to R is given by $$t = \frac{d \cos \theta_2}{c_2} + \frac{L - d \tan \theta_2}{c_1}$$

This may be rewritten as $c_1 t/d = \cot \theta_2 - \tan \theta_2 + L/d$.

If the receiver transducer on the waveguide 11 is now moved to the opposite end so that both R' and T are at the left ends of their respective waveguide antennas, travel time is increased by $L/c_1$. In other words, $$t' = \frac{d \cos \theta_2}{c_2} + \frac{2L - d \tan \theta_2}{c_1}$$

This may be rewritten as $c_1 t'd = \cot \theta_2 - \tan \theta_2 + 2L/d$. It is important to recognize that the same t' is obtained for rays transmitted towards the waveguide 11 prior to their striking the remote end X of the waveguide 10, or after their striking end X, provided both T and R' are at the left (same) ends of their respective waveguides, provided the waveguides are identical, and provided the fluid is homogeneous and either at rest with respect to the waveguides or at least without flow components parallel to the waveguide axes.

In the absence of flow, if the transmitter and receiver functions of transducers located at the left ends T and R' are interchanged or transposed, the time t' remains unchanged. However, if there is a flow component $V_\perp$, in a direction normal to the axes of the waveguide in the plane defined by the two rod antennas, then t' will be increased for one configuration (e.g. T transmitting to R') and decreased for the opposite configuration. As is well known from analyses of other contrapropagating transmission ultrasonic flowmeters, the time difference depends on geometry, and is proportional to the flow velocity $V_\perp$ divided by $c_2^2$. Determination of $c_2$ is usually not difficult. One would typically measure $c_1$ in the immersed antenna (if $c_1$ were unknown) and then obtain $c_2$ by utilizing a graphical procedure or equivalent iterative or look-up table procedure based on the above expressions involving t or t'. Hence measurement of the upstream-downstream time difference $\Delta t$ can be interpreted in terms of $V_\perp$.

Further insight into the refracted path in the fluid may be obtained from the right triangle OPQ included in FIG. 1. If hypotenuse PQ is drawn in proportion to $c_1$, and leg OQ in proportion to $c_2$, then angle OPQ $= \sin^{-1}(c_2/c_1)$ which is identical to $\theta_2$, the refracted angle of path pq between the waveguides 10 and 11. Angle POQ is a right angle and may be associated with $\theta_1$, the angle of incidence in the transmitter waveguide rod. The length of the other leg equals $\sqrt{c_1^2 - c_2^2}$. It is evident that triangle OPQ is similar to triangle opq defined by the hypotenuse path pq and a leg op drawn from p perpendicular to the waveguide 11, the length of leg op being equal to d. Transmission between the two antennas can not occur unless the magnitude of $\theta_2$ is greater than 0° but less than 90°. This means $c_2$ must be less than $c_1$. Otherwise the wave in the waveguide is totally internally reflected and the wave energy remains trapped within the "transmitting" antenna. For a given $c_2$ in a fluid whose flow velocity $V_\perp$ is to be measured in accordance with the principles of this invention, the designer as a minimum must select an antenna material, geometry and wave mode so that $c_1$ exceeds $c_2$, and further, must control $\theta_2$ so that propagation in the fluid interacts appropriately with $V_\perp$, and along a path that provides sufficient energy transmission from transmitting antenna to the receiving antenna. These and other design requirements will become clearer from subsequent illustrations.

Figure 2:
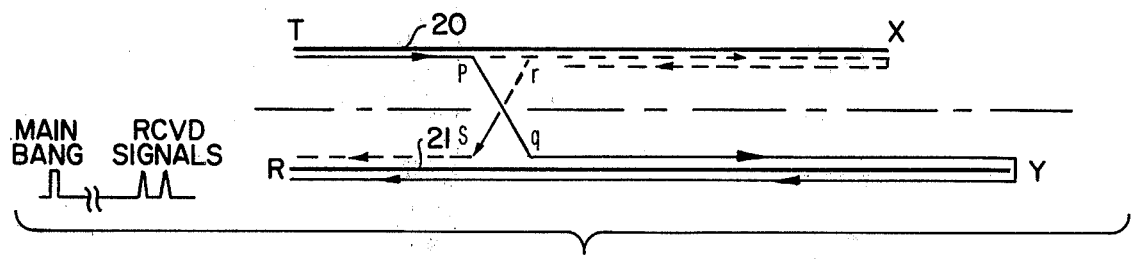
FIG. 2 represents a pair of waveguides similar to those of FIG. 1 but of unequal lengths.

FIG. 2 shows a pair of waveguide antennas 20, 21 which we may take as identical to those in FIG. 1 except that the antennas 20 and 21 are of effectively unequal lengths. (Effectively unequal lengths are produced, for example, by simply cutting one antenna shorter than the other, as illustrated. Alternatively, antennas of equal overall length can be made effectively unequal by providing a reflector a distance $\Delta L$ from the end opposite a transducer, in one of the waveguides. This latter method, not illustrated in FIG. 2, can provide timing echoes so that the speed of sound in the path of length $\Delta L$ can be compared with the speed of sound in the rest of that waveguide.) Assume again that extensional mode transducers are at left end locations denoted T and R. After an initial impulse at T, a portion of the pulse's energy will follow paths similar to TpqYR. However, because the antenna 20 is shorter than antenna 21, path TXrsR is shorter than TpqYR. Thus, in contrast to FIG. 1 where $TpqRR' = TXpq'R'$, the unequal antenna lengths separate "upstream" from "downstream" interrogations such as pq versus rs. Accordingly, a waveform diagram included in FIG. 2 shows two separate received signals, the separation at no flow being equal to $2\Delta L/c_1$ where $\Delta L$ is the length difference. This separation between pulses is increased by right-to-left flow parallel to the antennas, but decreased by left-to-right flow parallel to the antennas, for the illustrated T and R configuration. Observe that the change in time separation is measurable and convertible to V, without transposing transmitter and receiver functions at T and R. This method of separating upstream from downstream interrogations is somewhat sensitive to sound speed differences in the extra length of the antenna 21, as compared to the rest of the antenna(s). Note also that with this method time differences between the two received signals are not sensitive to flow in the plane of the antennas when this flow is orthogonal to the axis, since travel times along paths pq and rs would be perturbed equally by such flow. Therefore this arrangement may be used to resolve or isolate the axial component of flow in the plane defined by the antennas 20 and 21. This can be an advantage when it is desired to measure axial flow and not be confused or influenced by cross flow components. However, by transposing T and R, $V_\perp$ may also be obtained.

Figure 3:
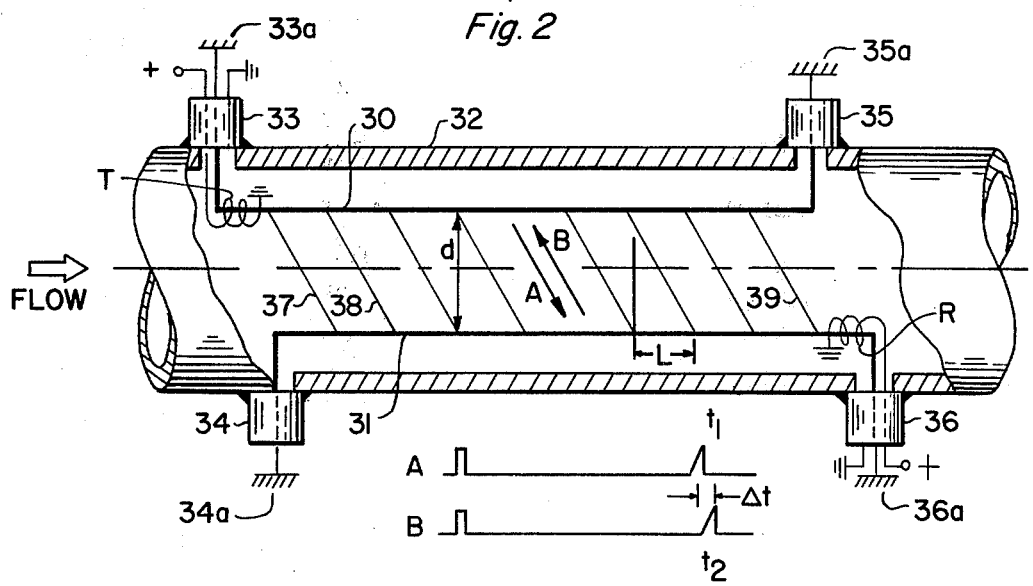
FIG. 3 represents a pair of waveguides installed in a pipe parallel to the pipe axis.

FIG. 3 shows a pipeline installation of a pair of antennas 30, 31 installed parallel to a pipe 32 axis, and communicating principally over paths such as 37, 38–39. Coils shown at antenna ends T, R perform transmitter and receiver functions, respectively by virtue of being coupled to magnetostrictive transducer portions of the antennas. A suitable magnetostrictive material is Remendur manufactured by the Wilbur B. Driver Company of Newark, N.J. This material is suitable for temperatures up to approximately 900° C. In suitable nonreactive environments, thoriated platinum may be used up to about 1500° C. and thoriated tungsten to over 2500° C. for antenna materials. Transmitter and receiver functions would generally be transposed in an alternating sequence as in conventional contrapropagating transmission flowmeters. The antenna 30 is supported by right-angled extensions which terminate in end clamps 33a, 35a. Such end clamps may be conventional compression fittings equivalent to those manufactured by Conax (Buffalo, N.Y.), Swagelok (Solon, Ohio) or others. Such fittings typically would thread into pipe-threaded half couplings 33, 35 which are shown welded to the pipe 32. Additional conventional supports may be used for long antennas.

For the other antenna 31, similar end clamps 34a, 36a are utilized, and likewise, similar half-couplings 34, 36. Conax multihole packing glands provide a convenient standard method for supporting both the right-angled extension and a pair of coil leads connected to the coil.

The timing diagram beneath the pipe 32 shows received signals for A and B (transposed) configurations. Arrival times under axial flow conditions are denoted $t_1$ and $t_2$ for the A and B configurations. Their difference is $\Delta t = 2LV/c_2^2$ where L = axial projection of any representative ray traveling the fluid-borne path and V = average flow velocity in the path, and c = sound speed in the fluid. The antenna 31 may be offset axially from the antenna 30 by the amount d tan $\theta_2$, where d is the separation between the antennas and $\theta_2$ is as defined in conjunction with FIG. 1.

By making the antenna lengths long compared to pipe radius, the measured $\Delta t$ automatically provides a measure of flow averaged down the length of instrumented pipe section, largely independent of radial components of flow. It is preferred that the antenna be at least as long as the diameter of the conduit in which it is installed. The prior art waveguide antennas of Swengel did not provide this feature because they communicated over a plane which was quite oblique to the flow, and so at any given radial position, flow was measured essentially at only one axial position and its mirror image (i.e., two axial positions, total). As is evident from FIG. 3, the present invention effectively provides many axially displaced paths (37, 38-39). A further advantage of the numerous axial paths in the plane defined by the antennas and parallel to the flow velocity vector is that, for multiphase flow, interruption of the interrogating wave along a particular ray or group of rays will block only a portion of the signal. Another advantage of the antenna arrangement of FIG. 3 is that the total projected area of the antennas in a plane perpendicular to the flow can be kept very small compared to the pipe cross sectional area. Therefore although flow can be measured over a considerable axial extent the flow obstruction can be minimized. If desired the antennas can be recessed.

Antennas such as 30, 31 could readily be operated at a frequency near 0.1 MHz, providing an interrogation wavelength in common liquids of 1 to 2 cm. This provides advantages over higher frequencies with respect to reliable propagation through multiphase or viscous fluids. Disadvantages however stem from acoustic short circuit tendencies (avoidable by selection of appropriate sealant materials in the compression fittings such as teflon or soft rubber), and somewhat degraded time resolution compared to, say, 1 MHz interrogation, and multipath propagation.

The concept of waveguide antennas parallel to the pipe axis, as illustrated in FIGS. 1-3, is further extended in the end views of FIGS. 4(a)-(f). To begin explaining this series of illustrations, consider FIG. 4(a) which may be thought of as the end view, simplified, of FIG. 3. A pipe 42 contains a single pair of antennas 40 and 41. To reduce their perturbation to the flow, the antennas 40, 41 may be mounted in recesses, as in FIG. 4(b). To reduce the perturbation still further, antennas such as 40a, 41a may be mounted in covered recesses 42a, 42b. The "covers" 42c, 42d must be reasonably transparent acoustically. Sometimes the original pipe wall material and thickness (e.g. plastic pipe or thin wall metal or glass) is reasonably transparent at the interrogation frequency, so that the transmission loss is less than about 10 dB per cover. In this convenient situation the assembly such as antenna 40a, recess enclosure 42a and a coupling fluid 43 may be clamped on or otherwise externally mounted outside the pipe 42. In other situations the cover of a cavity may need to be installed as a separate piece of plastic or acoustically thin sheet metal. This is indicated by covers 42e, 42f near the antennas 40, 41. Usually one would try to maintain the shape of the unperturbed pipe, in which case the cover shape would be made to conform to the pipe contour, as shown by covers 42c, 42d near antennas 40a, 41a.

So far in our discussion, the position of the antennas has been selected independent of the manner in which the interrogating wave averages the flow velocity profile. As explained in applicant's 1978 U.S. Pat. No. 4,103,551, and in the cited book Physical Acoustics-Vol. 14, pp. 487-503, certain paths are preferred when the object is to measure the area averaged flow velocity under varying flow conditions, e.g., both laminar and turbulent. One of the preferred paths is at or near a midradius chord for laminar and turbulent flows. Accordingly in FIG. 4(c) antennas 40a, 40b are shown communicating over one such midradius path. For this measurement to be accurate the antennas should not protrude into the flow stream. Thus a better set of locations for midradius antennas is indicated by 41a, 41b. Still better would be recessed antennas with covers restoring the circular pipe contour.

A more accurate solution to the profile problem is provided by quadrature methods, as explained in Malone and Whirlow's 1971 U.S. Pat. No. 3,564,912. To perform a 4-chord Guassian quadrature average, 4 pairs of antennas are positioned in FIG. 4(d) at normalized radial distances ±0.8611 and ±0.3399. Ideally, such antennas should be recessed so that standard weighting provides an accurate area average (e.g., Malone and Whirlow, or the cited Vol. 14, p. 498, Table XIV). In FIG. 4(d) it is understood that contrapropagating interrogation in parallel planes occurs between antennas such as 40a and 41a, and between 40d and 41d, for example. Proper weighting, however, can also be achieved by interrogating in planes which are not parallel, as in Vol. 14, p. 497, FIG. 65c.

Another way to obtain the area average is to install the antennas relatively close to one another so the fluid is sampled near a point where the local axial flow velocity happens to equal the area averaged axial flow velocity. For laminar flow this occurs at the normalized radial distance of 0.7071. For turbulent flow the distance increases to 0.76, approximately, the exact value depending slightly on Reynolds number Re. If the pipe diameter is sufficiently large, perhaps about 1 m or larger, as indicated in FIG. 4(e), antennas may be situated about 10 cm apart near or at the normalized radial distances appropriate to sensing the local flow, i.e., distances substantially equal to 0.7071 and 0.76 for laminar and turbulent flow, respectively. Note that a normalized distance of 0.75 is approximately correct for both laminar and turbulent profiles.

Figure 4A:
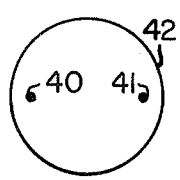
FIG. 4a is an end view of the waveguide antennas illustrated in FIG. 3.
Figure 4B:
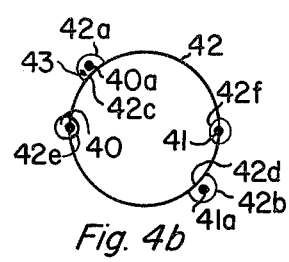
FIG. 4b illustrates waveguide antennas located in covered recesses.
Figure 4C:
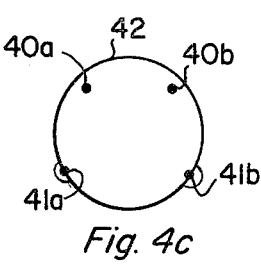
FIG. 4c illustrates waveguide antennas communicating over a mid-radius path.
Figure 4D:
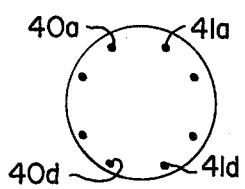
FIG. 4d shows an arrangement of waveguide antennas for performing four-chord quadrature average.
Figure 4E:
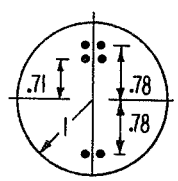
FIG. 4e illustrates perferred waveguide antenna locations.
Figure 4F:
FIG. 4f illustrates waveguide antennas installed in an eliptical pipe.

Another averaging method of interest is shown in FIG. 4(f), where an elliptical pipe contains a pair of antennas located at the ellipse's foci $F_1$, $F_2$. Although this method does not eliminate flow profile effects completely, theoretically it samples all the fluid in the elliptical pipe. For nearly circular pipe the two foci are close to the axis. The meter factor K for this case would approach 0.7500 for laminar flow and 0.93 to 0.97 for turbulent flow, $Re = 10^4$ to $10^8$, respectively (cited Vol. 14, pp. 488-489), provided the direct paths, analogous to paths pq or rs in FIG. 1, were gated out or disregarded, and provided one instead used essentially radial paths reflected off the pipe interior. In this case, if one chose to use the direct path, and accordingly sampled the flow only near the axis of a nearly round pipe, the meter factor $K' \approx 0.5$ for laminar flow and $K'$ would lie between about 0.8 and 0.9 for turbulent flow, depending on Re approximately as follows, based on calculations in H. Schlichting, Boundary Layer Theory, 6th Ed., p. 564 (1968), McGraw-Hill:

| Re | 4000 | $10^5$ | $3 \times 10^6$ |
|---|---|---|---|
| K' | 0.79 | 0.82 | 0.87 |

In FIGS. 4(a')-(f') we introduce structures which in some cases bear a converse relationship to earlier structures. For example, we may think of FIG. 4(a) as showing a pair of "axial" antennas communicating over paths in a diametral plane. Conversely, in FIG. 4(a') we see "diameter" antennas AC and DF a distance L apart, communicating over the equivalent of axial paths. Transducers would typically be installed at ends such as A or C, or D or F, but they could also be installed at other locations such as at the antenna centers B and E.

Another converse configuration is given in FIG. 4(c') where antennas 44 are installed along midradius chords, providing a "dual" of the configuration of FIG. 4(c). FIG. 4(d') shows antennas 44' at the Guassian distances stated in connection with FIG. 4(d).

FIG. 4(f') shows an arbitrary conduit boundary in which the flow is sampled at many locations by pairs of chord-located antennas in planes parallel to one another and to the flow.

Figure 4G:
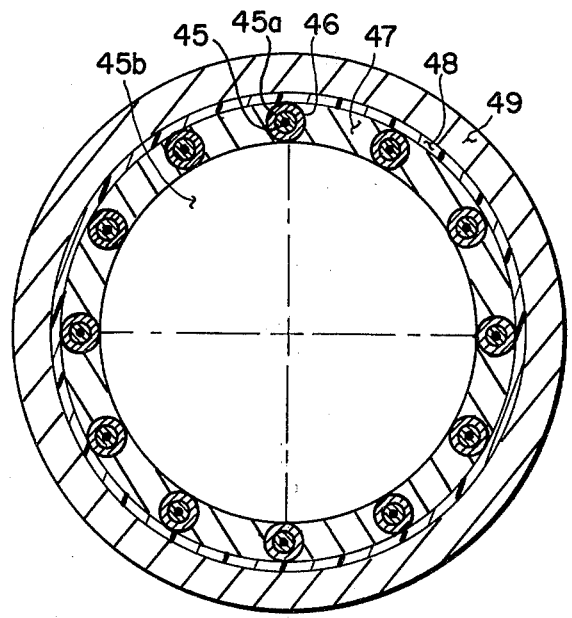
FIG. 4g illustrates a plurality of waveguide antennas employing liquid coupling.
Figure 4A:
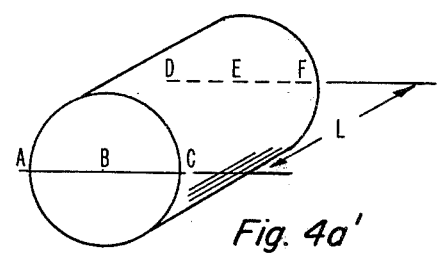
Figure 4C:
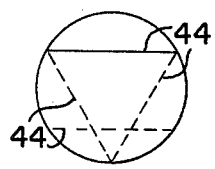
Figure 4D:
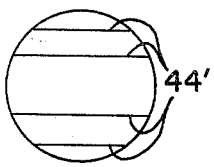
Figure 4F:
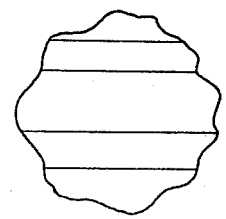

One version of the configuration represented by FIG. 4(d) is shown in greater detail in FIG. 4(g). In this detailed representation, the pipe 49 contains an assembly of antennas 45 radiating through coupling liquid 45a into flowing fluid 45b. The antenna is surrounded by an acoustically transmissive shield 46 which will be discussed in more detail subsequently. The antenna is periodically supported by small O-rings or washerlike gaskets to maintain parallelism with the portion of the shield through which radiation is desired. All the shields are potted within a compound 47 such as epoxy, RTV silicone rubber or equivalent material. An acoustically isolating material 48 such as asbestos or asbestos-equivalent or asbestos-substitute (teflon sheet, etc.) lies between compound 47 and pipe 49. The assembly consisting primarily of the antennas and compound, and preferably the additional members such as shields, antenna support means (not shown), coupling fluid and isolating means, may be thought of as an array insert to be installed within a section of pipe or within a spool-piece.

The elements of the array may communicate with one another in several useful ways. The most obvious way is for pairs to operate with one another across diametral paths; e.g., 12 o'clock and 6 o'clock antennas; 1 and 7 o'clock, etc. Again, this samples a good fraction of the cross section but the meter factor is still profile dependent. To obtain flow data from which the profile can be determined and its influence thereby be compensated for, nondiametral paths may be used. Such paths may be a series of parallel paths, or a series of angular paths as obtained when the 12 o'clock antenna transmits, and all others receive, and vice versa. (Ref.: S. Johnson et al., 1975–1978, in cited Vol. 14, p. 497, FIG. 65c, used nonparallel linear (but not planar) paths; likewise for the applicant in his earlier proposal to measure temperature distributions, as reported in NASA CR-54979, FIG. 39, February 1966.)

If pipe 49 were a square or rectangular conduit, closed or open at the top, and filled or only partly filled, the antennas could analogously be installed as part of a linear insert, along the side walls, parallel to the flow velocity vector. In this case parallel sheets of interrogating ultrasound could sample a very representative fraction of the flow and thereby promote profile immunity as well as promote immunity to loss of signal due to scattering by a second phase such as bubbles or undissolved solids. In other words a considerable volume of fluid would be interrogated in a manner conducive to high accuracy and reliable operation despite unfavorable fluid conditions.

Part of FIG. 5 shows cross sections of antenna systems comprised of (a) a solid rod, (b) a hollow tube, (c) a solid rod surrounded by a concentric tubular shield or sheath, and (d) a solid rod surrounded by an omega-shaped shield containing flanges or lips suitable for mounting onto a wall of a conduit, and containing a stiffening rib between each of the flanges and the generally circular portion of the shield. In FIGS. 5(c) and (d) an intermediate fluid, usually liquid and often the same liquid as that whose flow velocity is to be measured, fills the space between the antenna itself and the shield. Provided the shield's acoustic impedance and/or its thickness is sufficiently small, the shield behaves as an acoustically transparent structure. As shown in the cited Vol. 14, p. 447, FIGS. 52(a) and (c), transmission through a thin immersed metal sheet is efficient even at angles beyond that calculated by Snell's Law to be the cut-off angle. Referring again to FIG. 5(c), this configuration has been tested using extensional waves at $\sim 100$ kHz with the central antenna consisting of a 1.6 mm diameter rod radiating into water through an approximately concentric stainless steel tube of approximately 15 mm diameter by 1 mm wall thickness. In order to increase the transmission through the shield at higher frequencies, or to reduce the mass of the shield, the shield thickness may be reduced considerably. Tube wall thickness as small as 0.1 mm are commonly available for many engineering materials. However, such thin walled tubes are not always adequate structurally, as their reduced stiffness is subject to vibratory motion. Therefore in FIG. 5(d) the thin shield 51 is reinforced or stiffened in one direction by ribs such as rib 52, and stiffened in another direction by rib or brace 53. Alternative or additional stiffening may be installed inside the sheath so as not to interfere with the flow of fluid 57. Internal stiffening may also be accomplished by a thicker mass in directions or places where transmission is unimportant or where transmission is preferably blocked, e.g., on the flanged side of shield 51. The omega-shaped shield is attached to wall 55 of the conduit by flange 54.

As an example of one practical implementation of the concepts illustrated in the foregoing diagrams, and in particular, the combination of ideas of FIGS. 1, 3 and 5(d), consider FIG. 5(e). FIG. 5(e) represents the use of waveguide antennas to measure fluid- and flow-related parameters in a partly filled conduit in which additional penetrations for measurement purposes are highly undesirable. One example would be a subterranean tunnel. Another specific example is a masonry or concrete sewer pipe, which in some instances may be about 2 m diameter and have walls as thick as 100 to 200 mm. Typically installed below grade, access is limited to one of the following: a manhole, sidebranch or flange. In FIG. 5(e), then, there is represented a buried concrete pipe 509 having a manhole port 510 covered by a plate 511. The pipe is partly filed to the level H by a liquid flowing with a velocity $\overline{V}(h)$, where h = vertical coordinate. It is common practice to install velocity sensors at the height H = kD where k = 0.2 and D = pipe inside diameter. The average flow velocity $\overline{V}$ may be computed from V(0.2) plus a measurement of H. The apparatus of FIG. 5(e) may be used to measure V(0.2) and H, and also the fluid temperature T, from which a variety of fluid- and flow-related parameters may be computed and displayed and recorded, such as: V, H, volumetric flow rate Q, T, the fluid density $\rho$, the mass flow rate $\dot{M} = \rho Q$, and totalized volumetric flow $\int Q dt$ where t = integration time, and also $\sigma$, the standard deviation of any of the selected parameters. An electronic instrument appropriate for these purposes is represented by the console 513.

Within the aforementioned pipe and manhole, let there be installed from within, via the manhole, an instrumentation conduit such as 25 to 30 mm OD stainless steel pipe or tube having a principally vertical portion 506 to which may be joined a horizontal portion 507 closed at end B, the sealed joint being at point A. Horizontal portion 507 may be of thinner wall than the rest of the instrumentation conduit. The instrumentation conduit is lagged or otherwise secured to the inside wall of the concrete (sewer) conduit by clamps 514$a$, $b$, $c$-, $d$. A first antenna 500 may be installed from the outside, above-grade access point, by inserting the waveguide and feeding it down the instrumentation conduit until tip 504 hits closed end B. Antenna 500 is fitted with centering and isolating washer-like gaskets 503$a$, $b$, $c$—, $d$ to achieve a coaxial installation within the instrumentation conduit. The antenna may include a reflector 505 corresponding to the joint location A. The illustrated structure includes a magnetostrictive transducer segment 502 surrounded by a coil 501, but other transducer types could be employed, i.e., piezoelectric. Once installed, the antenna can radiate through the acoustically transparent part of the wall of the instrumentation conduit, provided that part of the conduit is full of a transmissive liquid such as water, water/glycol, oil, etc., at least over the axial region of interest for the V measurement, denoted $L_a$. The transducer lead wires, of course, extend vertically and are shown emanating from the conduit as shielded coaxial cable 512. The end view shows that the two similar antennas 500, 500' have been installed symmetrically; their axial locations may be offset somewhat to account for refraction. Region $L_a$ begins typically one or more diameters upstream of the manhole to avoid flow perturbations caused by the manhole.

In the end view, oblique path 515 in the horizontal plane at elevation H=kD is utilized to measure V(h), at h=kD=0.2 for example. This path can also yield the sound speed in the liquid, c. (For a known pure liquid c could yield the liquid's temperature; for a binary liquid having two known constituents and having known temperature T, c could yield the composition.) In addition to direct path 515, there is also an indirect path 516 off the surface, which can be interpreted in terms of H. (Sometimes additional or different transducers, or use of the vertical portion so the antennas [as will be explained in connection with FIG. 8($a$)] would be preferred for the H measurement.) There is still another indirect path 517 along which the beam is partly absorbed by debris 518 at the bottom of the pipe; but if the beam along path 517 is reflected to the second antenna 500' then the level of the debris may be calculable.

Returning to the separate drawing of the antenna 500, we point out that the previously mentioned reflector 505, together with the end termination or reflector 504, yield a pair of echoes separated by a time interval which can be interpreted in terms of waveguide temperature, from which the liquid temperature T is inferred, from which the liquid density is calculable. By keeping $L_a$22 D, or $L_a>100$ wavelengths in the fluid ($\lambda_f$) reliable operation is maintained despite uncertainties in refracted angle or occasional passage of local inhomogeneities typical of sewage. The system illustrated is thus seen to be flexible, modular, retrofittable removable, serviceable, and efficient in the use of a minimum number of transducers to measure a maximum number of parameters, and not to require any additional penetration of an installed concrete pipe which has a manhole near a useful location for measurements.

Figure 6A:
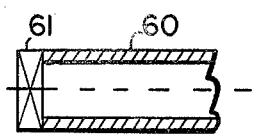
FIG. 6a shows a waveguide antenna utilizing a transducer disc.
Figure 6B:
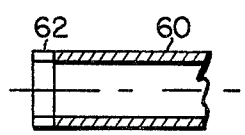
FIG. 6b shows a waveguide antenna employing a piezoelectric transducer.
Figure 8A:
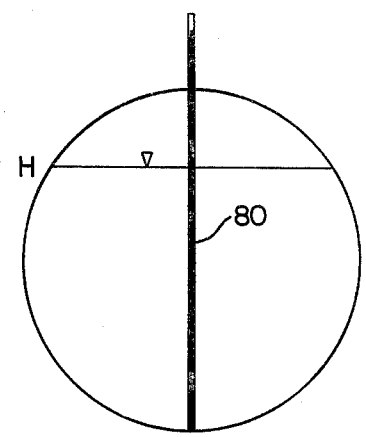
FIG. 8a shows a vertical waveguide antenna in a partly filled conduit.

FIG. 6 shows tubes which may be similar to that described in connection with FIG. 5($c$), but where a tube 60 itself is the antenna, and where the transducer is a disc 61 or an annular piezoelectric element 62. The element may be selected to preferentially launch or detect extensional (compressional) or Lamb or possibly other wave modes which may prove useful in interrogating a fluid.

Figure 7:
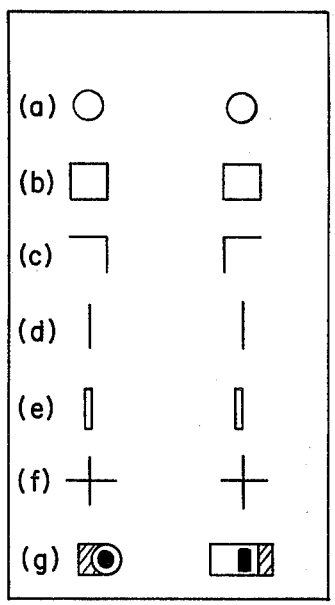
FIG. 7a shows a pair of waveguide antennas having a circular cross-section.
FIG. 7b shows waveguide antennas having a square cross-section.
FIG. 7c shows a pair of right angle waveguide antennas.
FIG. 7d shows a waveguide antenna for tortional mode transmission.
FIG. 7e shows another pair of waveguide antennas adapted for tortional mode transmission.
FIG. 7f illustrates a crossed arrangement for tortional mode operation.
FIG. 7g show waveguide antennas within fluid filled envelopes or shields.

FIG. 7 illustrates a variety of cross sections of antennas which may be oriented either parallel, oblique or orthogonal to the conduit axis. Depending on antenna cross-sectional dimensions compared to the wavelength therein, certain antenna shapes may be used most efficiently with one particular wave mode, e.g., extensional; some shapes may be used with good efficiency with two or more modes. Sometimes the size compared to wavelength will dictate when a particular cross section will become dispersive for a particular mode, e.g., the torsional mode is dispersive in a rectangular cross section if the larger dimension exceeds about 1/10 of a wavelength. If the cross sectional dimensions are smaller than about one fifth of a wavelength, all shapes shown in FIG. 7 could convey extensional waves. The noncircular shapes could additionally convey torsion, as might be desired for density measurements. This concept is explained by the applicant in U.S. Pat. No. 4,193,291 (Mar. 18, 1980). The applicant has also observed that when a pair of immersed noncircular cross section antennas such as those of FIGS. 7($b$), and ($d$)–($f$) are operated in the torsional mode only, transmission between them is negligibly small. This appears to be due to these antennas being symmetrical about a plane between their centerlines. Under torsional excitation, the antenna cross section appears to behave as a dipole with two halves radiating out of phase, resulting in cancellation except in the near field. This nulling of noncircular torsional mode antennas having point symmetry can be avioided with a design such as FIG. 7($c$), which does not have point symmetry and which accordingly may be used as a slow wave source of longitudinal waves in a fluid, and yet simultaneously may be used as a density sensor, the combination being useful as a mass flowmeter.

In FIG. 7($g$) the antennas are represented by the solid cross section within the fluid-filled envelopes, or shields. The circular cross section antenna at the left may be thought of as a line source at the focus of an elliptical or parabolic reflector, or even a circular reflector, since for small arcs the differences in curvature of these reflectors may not be of practical significance. The leftmost surface of this reflector is flat, to act as a vortex shedding bluff body when placed across a conduit, or to act as an alignment fixture when placed alongside the wall of a conduit. The radiation from the rectangular cross section antenna at the right side of FIG. 7($g$) is enhanced by the presence of a flat reflector. This antenna preferentially receives energy from the left by virtue of its shape, orientation, and the parallel surface of its thin flat shield.

FIG. 8($a$) represents a pair of parallel antennas 80 much like those in FIG. 4($a'$) except in FIG. 8($a$) the antennas are explicitly shown in the vertical direction to be responsive to the level H of the liquid within the partly filled conduit. It has been observed that the transmission of energy between such a pair of antennas 80 increases as the level increases, the received signal amplitude increasing approximately in proportion to the level. This may be understood from FIG. 1, in that the more surface elements that are wetted, the more rays can convey energy from the transmitter antenna to the receiver antenna. This idea for measuring liquid level is further explained in the applicant's paper in the 1979 Ultrasonics Symposium Proceedings, IEEE Cat. No. 79CH1482-9, pp. 376-379. We will return to FIG. 8 in a few moments.

Figure 8B:
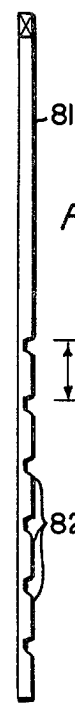
FIG. 8b shows a vertically oriented waveguide containing a series of equidistant surface discontinuities of low reflectivity.
Figure 8C:
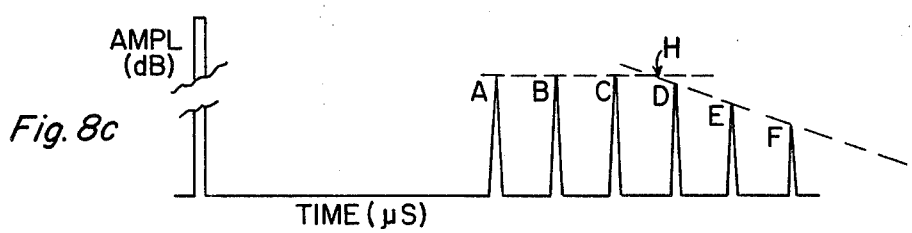
FIG. 8c shows a semilogarithmic plot of amplitude versus time for echos from a partly immersed multizone probe antenna.
Figure 8D:
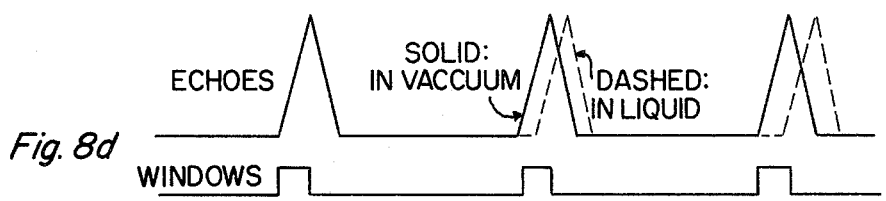
FIG. 8d shows signals produced by the antenna of FIG. 8b.
Figure 9A:
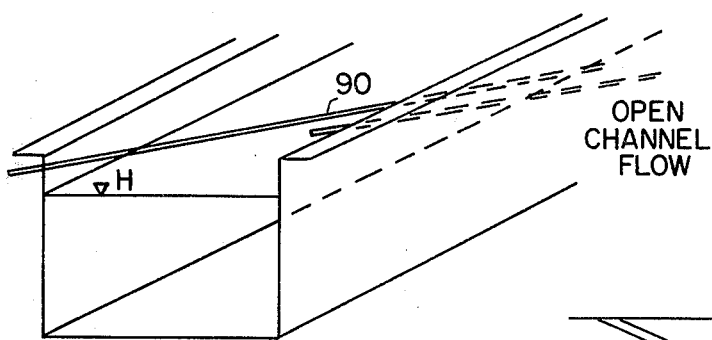
FIG. 9a shows antennas installed nearly parallel to the open channel flow velocity vector to respond to both the average flow velocity and also the liquid level.
Figures 9B, 9C:
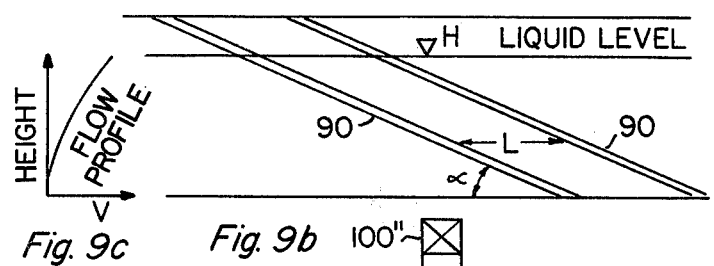

FIG. 9 extends the idea of FIG. 8 to the case of open channel flow, where it is desirable to measure both the average flow velocity $\overline{V}$ (despite a potentially complicated profile) and the liquid level H, in order to compute the volumetric flow rate $Q = \overline{V}A$ where $A$ = area of flowing liquid, which is a function of H. (In some weirs or flumes measurement of the level H is sufficient to compute Q; see cited Vol. 14, pp. 458-462.) Specific features of FIGS. 9(a) and (b) include the placement of both antennas 90 close to opposite side walls; orienting them nearly parallel to the conduit axis, in other words, keep $\alpha$ small compared to 45°, e.g., $\alpha \leq 15° = \pi/12$ radians; the axially projected distance of the antenna separation is L. A hypothetical example of the flow profile for this case is represented in FIG. 9(c).

Figure 10A:
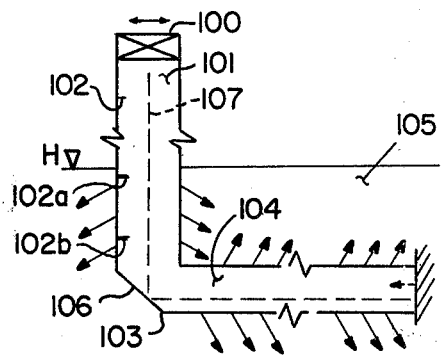
FIG. 10a represents a shear mode waveguide including an impedometer portion with reference reflectors suitable for measuring both fluid impedance $\rho c$ and liquid level H, and a flow velocimeter portion appropriate for interacting with the flowing fluid along a plane parallel to the flow velocity vector V.
Figure 10B:
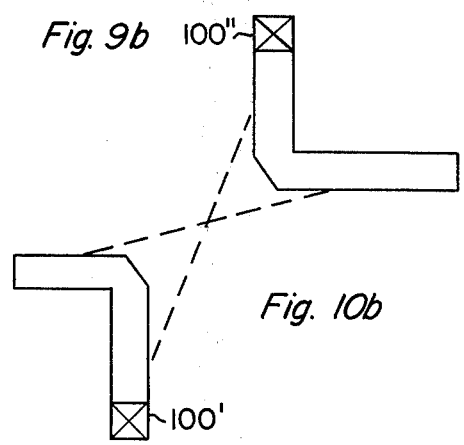

FIG. 10(a) shows a two-leg impedometer probe responsive to the acoustic impedance $\rho c$ of a fluid 105, folded through an angle of 90° such that the vertical leg is responsive to liquid level H. When both legs are oriented in a plane parallel to V, V may be resolved in two different directions, e.g., the directions parallel to each leg. Another example of a pair of L-shaped antennas each having two legs (in other words, two main portions or segments, typically orthogonal, at least one leg being up to 100 wavelengths long, 100 $\lambda_f$, or longer as measured in the fluid at the center frequency of the interrogating spectrum) responsive to different components of V along the dashed paths is indicated in FIG. 10(b). Transducers 100' and 100" are shown at one end of each antenna. Returning to FIG. 10(a), reference reflections are obtained from the low-reflectivity notches 102, 102a,-, 102b and the surface 103 adjacent 45° chamfer 106. These reflections are preferably obtained using a shear mode crystal 100 oriented to provide vertical polarization relative to the chamfer, and thereby reflect without internal mode conversion into the second leg 104, along the dashed path. Arrows along the wetted surfaces of both legs represent energy radiating into the fluid as the wave 107 propagates away from the transducer 100.

Impedometer operation for measuring fluid impedance or liquid level has been discussed in the cited Vol. 14, pp. 460 and 507-510, and by the applicant and Seger and Bradshaw in the U.S. Patent Application Ser. No. 111,466, filed Jan. 11, 1980.

Another motivation for using a two-leg antenna similar in principle to that of FIG. 10(a) is provided by rivers and streams when it is desired to measure their flow velocity despite fluctuating vertical and horizontal gradients in temperature T. The fluctuating vertical (y) gradient is caused by the daily and seasonal heating and cooling cycle. The fluctuating horizontal (x) gradient may be caused by the entry of a smaller natural stream or a heated effluent from a large mill, factory or power plant. The T gradients cause gradients in sound speed c, which in turn causes an interrogating beam to refract and follow a path which deviates from a straight line. When the distance between transmitter and receiver antennas is large, the beam can deviate so far as to be not receivable. In the past, one approach to solving this deviation problem has been to use xy transducer arrays with elements distributed in the x and y directions. One form of the present invention provides approximately equivalent xy coverage using, for example, only one transducer on each side of the stream, and an antenna folded along x and y directions. The x leg would be oriented generally parallel to the bank. Radiation from each leg may be enhanced by reflectors, to increase the effective aperture and thereby decrease beam spread to a value which is still sufficient to compensate for refractive fluctuations. Again, applications of this type may benefit from orthogonal portions of 100 $\lambda_f$ long-legged antennas.

Figure 10C:
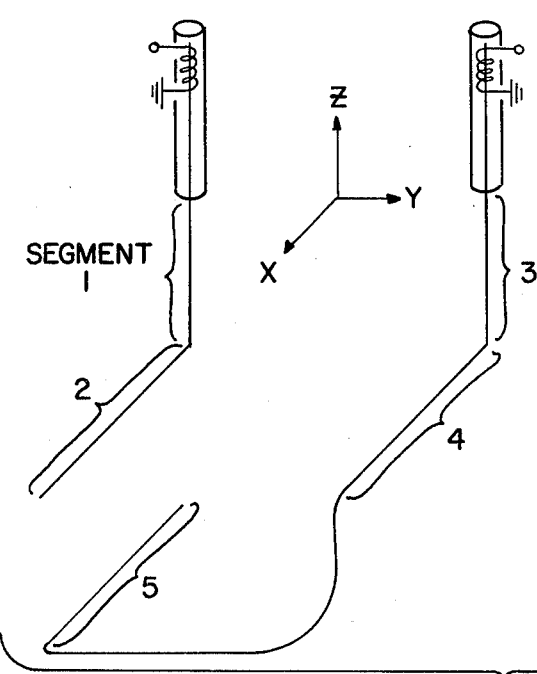

In FIG. 10(c) we show one example of how the two-leg concept may be extended to the three dimensional case. The segments of each antenna would typically establish or correspond to the xyz axes of a rectangular coordinate system. Communication between selected segment pairs at predetermined average times can be shown to respond to flow components not orthogonal to the plane defined by each pair, e.g., not $V_x$, not $V_y$, not $V_z$, respectively. The segments utilized may be selected by masking and/or time gating. The orientation in FIG. 10(c) implies that the antenna can be rotated until one or more of its segments lies in a plane parallel to the flow velocity vector.

FIG. 11 shows another form of impedometer probe useful in measuring flow velocity V as well as $\rho c$. Portions of this probe are surrounded by a shield 111 which does not transmit efficiently, e.g., is not thin compared to wavelength. Therefore only a limited portion of the probe'surface, specifically, unshielded area 110, is wetted by the liquid in which the probe is immersed. Accordingly, this probe is responsive to the impedance $\rho c$ of the liquid whose velocity is being measured, as opposed to the impedance of other regions of the liquid whose velocity is not being measured.

FIG. 12 utilizes the cross section of FIG. 7(c) in a mode converting arrangement wherein extensional waves generated in the magnetostrictive transducer 120 are mode converted to flexural waves in the antenna. Using brass structural shapes as are commonly available in model railroad hobby shops, such as a shape having a cross section about $3 \text{ mm} \times 3 \text{ mm} \times \frac{1}{4}$ mm thick (termed as "angle"), driven at $\sim 100$ kHz, I found that the resultant wave propagated rather dispersively in the angle, and could be transmitted as a longitudinal wave across water or air to a similar receiver antenna. By simply blowing across the antennas when they were mounted in air, blowing generally perpendicular to their axes, I was able to demonstrate the increase or decrease in transit time according to the direction of blowing relative to the direction of propagation across the air gap of about 25 mm between the antennas. Antenna lengths were 150 mm in these experiments, or about 50 $\lambda_f$.

FIG. 13 shows a nondestructive testing (NDT) angle beam transducer 130 appropriate for launching a Lamb wave in a strip 131. The Lamb wave is then coupled or transmitted into the adjacent liquid. Transducers for this purpose are commercially available from Panametrics or other manufacturers of NDT flaw detection equipment. Operating frequencies generally lie in the 1 to 10 MHz range. In some cases the Lamb wave angle beam transducer could be installed inside a small-diameter tubular antenna. The antenna then serves as a "catheter" inside the main tube or duct of large dimensions.

FIG. 14 shows a shear wave transducer 140 lauching a transverse shear wave in a strip 141, again leading to an ultrasonic wave which can leak off into the adjacent liquid. The centerlines in FIGS. 13 and 14 imply a second identical antenna strip and transducer symmetrically located to operate in conjunction with the transducer and strip illustrated. Lamb waves are dispersive, but they offer a wider choice of "incident" velocities in a given waveguide antenna, selectably based on the strip material, thickness and excitation frequency. The shear wave can propagate nondispersively at a single velocity dependent on the shear modulus and density of the strip material. Optical quality fused silica strips could support shear waves at frequencies up to hundreds of MHz. This could be useful in making antennas which are tiny yet highly directional. At such frequencies, however, the attenuation coefficient in most fluids is extremely high.

At this point in our discussion it is convenient to return to FIG. 8 and consider the effects of immersion on the propagation of the various waves in antennas as illustrated above. Further, it will be convenient to introduce a multizone pulse echo measuring concept for sensing liquid level, relatively independent of the liquid sound speed and density. Let the axis of an immersed waveguide 80 or waveguide segment be oriented vertically as in FIG. 8. For flexural waves and torsional waves in noncircular waveguides, immersion *slows down* the waveguided speed of sound markedly. For transverse shear waves as in FIG. 10 or 11, the main effect of a nonviscous liquid would be to *attenuate* the wave in the immersed portion of the guide. Lamb and surface waves would be attenuated too; their velocity would be affected only very slightly. Extensional waves in a smooth-walled thin metal waveguide (e.g., stainless steel rod in water) would propagate almost immune to the presence of liquid, the velocity decreasing much less than 1%, and attenuation hardly increasing. Extensional waves in a *plastic* (low impedance) waveguide, however, are significantly attenuated when the waveguide is immersed in a liquid. Referring now to FIG. 8(b), we see a representation of a vertically oriented waveguide 81 containing a series of equidistant surface discontinuities 82 of low reflectivity. (L=spacing.) Notches are probably one of the easiest types of surface discontinuities to produce and adjust in depth and/or width and length and possibly shape, to produce a series of periodic echoes of essentially equal magnitudes and rather similar pulse shape. Now let a series of electronic windows be generated corresponding to the arrival times of the series of echoes. For wave/waveguide combinations where the principal effect of immersion is to attenuate the guided wave, it is clear that by measuring the energy content or peak amplitude of the echo in each window, one can conclude that discontinuities (notches) whose echoes are attenuated, are immersed. Less obvious, however, is the analysis of a notch which is at or just below the liquid level. In this case the echo is not attenuated significantly. The grahical or equivalent algebraic general approach to be described covers this case, thereby eliminating any uncertainty in liquid level which could otherwise be as large as L.

In FIG. 8(c) we show a semilogarithmic plot of the amplitude vs time, for echoes A, B,-, F, for a partly immersed multizone probe antenna in which the discontinuities were adjusted for equal echo amplitudes in air or vacuum. The unknown liquid level H is found to be above the discontinuity that produced echo D by h, a distance that can be interpolated by considering the intersection of the tangents to the echo peaks. It is interesting to recognize that H can be determined in this manner even if the liquid is of unknown impedance, that is, even if the liquid's sound speed and density, or attenuation per unit length of immersion, are unknown, provided at least two echoes are attenuated.

In FIG. 8(c) the liquid level H lies above the notch that produced echo D by the distance $h = L[1 \text{ n } (A/D)]/[1 \text{ n } (D/E)]$ where L=distance between notches and A, D and E are echo amplitudes, all of which were identical in vacuum. This algebraic result, equivalent to the graphical procedure, assumes attenuation is due only to immersion, and not to other causes such as residue or nonuniform temperature distribution. If H is at notch D, $A/D = 1$ and the equation correctly yields $h = 0$.

The technique for measuring liquid level, as just described, differs in several important respects from Van Valkenburg's U.S. Pat. No. 2,787,160 (1957). That patent does not consider nor describe means for reducing the uncertainty in liquid level measurement to less than the distance L between reflectors (i.e., ambiguous when the level is right at or very near a reflector). That patent does not consider reverberations between reflectors, nor suggest limits on the reflection coefficients so that the reverberations would be kept small enough to avoid serious error, and at the same time small enough so that adequate energy could reach the bottom reflector. That patent deals with this question in a qualitative manner by specifying that deeper holes should lie closer to the surface along which the interrogating surface wave is propagating, "in inverse ratio to the distance of said holes from the point of transmission." In the present invention, the magnitude of the sound pressure reflection coefficient is preferred to be at least a factor of 3 above the coherent noise in the antenna, but not larger than 0.2, and preferably not larger than 0.1 if more than 5 discontinuities are utilized. Furthermore the reflection coefficients are specified to be either substantially identical, or monotonically increasing with distance from the transducer such that in vacuum the echoes from the discontinuities would be substantially identical.

For combinations of waves and waveguides wherein the wave speed is reduced upon immersion, as with flexural waves, or with torsional waves in a noncircular waveguide, one can respond to the transit times directly, and interpret their increase in terms of liquid level. However, the delay of echoes from submerged reflectors can also be sensed by using narrow windows whose positions and widths are adjusted to capture a predetermined fraction of each echo in vacuum, but a lesser fraction, as immersion delays the echo out of the window, as in FIG. 8(d). For example, suppose one approximates the echo as a triangular pulse having a leading edge rise time of, say, 10 μs, and a peak value of 10 V. Now adjust a 10 μs window to capture that echo's leading edge when not immersed. Now if immersion delays that particular echo by 5 μs, the peak value in the window would be proportionately reduced, i.e. to 5 V. Thus a narrow window and peak detector can operate as a time to amplitude converter. Suppose a probe as in FIG. 8(b) yielded in vacuum six identical periodic echoes from equidistant discontinuities. Suppose that when partly immersed, peak detected values were A=B=C, and D, E, . . . were increasingly attenuated by being delayed partly out of their respective windows. Then the distance h that the liquid level H lies above the discontinuity producing least-delayed echo D can be shown to be of the form $h = L(A-D)/(D-E)$. When the level H coincides with notch D, this equation correctly yields $h = 0$.

We return now to further discussion and description of antennas and their mounting in preferred configurations for measuring flow.

FIG. 15 shows a pair of parallel antennas 150, 151 interrogating a flowing fluid 157 within a spoolpiece including a pipe section 154 welded at each end to flanges 153a, 153b. Fluid inlet and outlet consist of pipes 155a, 155b. The transducers are outside the spoolpiece, and if magnetostrictive as in the present illustration, would be surrounded by coils such as 156a–d. Ultrasound passes with little attenuation from the transducers through compression fittings 152a–d, these fittings being of conventional design and available from Conax, and containing soft sealants such as neoprene or silicone rubber, or available from Swagelok and fitted with teflon ferrules. An alternate form for sealing a magnetostrictive transducer is shown also, and consists of a sealed metal sheath 159c, typically stainless steel of $\frac{1}{4}$ mm wall thickness, welded to a flange 153c. Coil 156e is placed around the sheath. When the coil is energized, it couples magnetically to the magnetostrictive material 158. This material is often a short stub perhaps 25 mm long, and is shown attached at its left end to the end seal of the sheath, and at its right end, to the antenna 150a. These attachments are typically welded or brazed connections. In operation the flowmeter of FIG. 15, assuming flow in the direction indicated by the arrow, would normally involve upstream interrogation from, say, 156d to 156a, and then downstream interrogation from 156a to 156d. The other pair of coils may serve as spares, or be used for simultaneous upstream-downstream interrogation.

FIG. 16 shows antennas 160a, 160b installed across parallel diameters or chords in a round pipe 166 in which a fluid 167 flows. Inside the pipe 166 the antennas are shielded from the flowing fluid by tubes 161a, 161b which are acoustically transmissive at least on the portions facing one another. The tubular sheaths are insulated electrically from the pipe by electrode feedthroughs 162a, b, these being of conventional design and available from Conax. A liquid 168a, b fills the sheath at least within the pipe 166, and at least during times when it is desired to transmit interrogating waves from one antenna to the other. Each antenna is centered and supported within its sheath. Support means include conventional compression fittings (not shown) that attach to exposed ends of the sheath and to the antenna ends. Several small washerlike gaskets or spacers may be located along the antenna to maintain a centered position within the sheath. The fluid 168a, b is acoustically transmissive, and is not necessarily the same fluid as that in the pipe 166. Suppose fluid 167 gradually causes deposits to build up on sheaths 161a, b, but these deposits are such that they can be melted off or burned away, if the sheaths can be heated. For this purpose, electrical contacts 164a, b are made available, to which electrical heating source 163 may be connected. This source 163 may be a variac autotransformer, welder power supply, etc. The other source terminal 169 would be connected to the opposite end of whichever sheath was being electrically resistance heated.

An alternative means of heating the sheath to prevent or to remove deposits consists of passing a heated fluid 168a, b through the sheaths. Dowtherm or other high temperature fluids are commonly used for such purposes, and pipe connections (not shown) of conventional design may be used to convey the heating fluid to and from the sheath. In some cases, electrically heated hose may be used as the sheath, for example, Model 100 hose manufactured by Technical Heaters Co. of San Fernando, Calif.

FIG. 17 shows three examples of relatively short antennas used as probes. For sake of explanation the antennas are mounted within conventional pipe plugs, which in turn may be screwed into airfoils or other aerodynamic objects to probe the flow of fluid adjacent to the airfoil or object. In FIG. 17(a) a pair of antennas 170a, b protrude into a flow stream. They are supported by conventional compression fittings 171a, b of the types previously mentioned. Coils energize or receive energy from transducers to which they are coupled. Alternatively, piezoelectric transducers may be used. The antennas may be surrounded within the plug by teflon tubing to dampen vibration. To minimize acoustic short circuit within the mounting, alternating layers of low and high acoustic impedance materials may be installed, e.g., teflon tape between steel fittings. FIG. 17(b) represents a 3- (or optionally, a 4-) antenna probe. Its purpose is to sense or resolve flow velocity components in x and y directions, based on propagation between pairs of antennas 170c, d, d' and e.

FIG. 17(c) shows a pair of antennas 170f, g shielded in the vicinity of their mount, but unshielded in the "free stream" region. The unshielded region includes elliptically curved reflectors 171a, 171b to enhance propagation in the path between the reflectors. For example, the reflectors may control the main lobe of the reflected beam, as defined by its 3 db points, to lie within 5° of the plane containing the corresponding antenna segments 170f, g.

FIG. 18(a) is a graph of Snell's Law showing the refracted angle $\theta_2$ as a function of $c_2/c_1$, the ratio of sound speeds in the fluid and waveguide, respectively. FIG. 18(b), (c) show specific examples of refracted rays for $c_2/c_1 = 0.866$ and 0.5 respectively. It is always challenging to seek ways of avoiding the limitations apparently imposed by Snell's Law. One acceptable way of apparently breaking Snell's Law is shown in FIG. 18(d) where a threaded rod is used as an antenna. This approach may be used for several wave types, but its use is perhaps most attractive for waves which can be radiated nearly perpendicularly to the thread faces. This requires a wavelength in the fluid not much larger, and preferably smaller, than the distance between threads. For a standard thread such as 4–40 or 6–32, the effective refracted angle is nearly 60°. By way of illustration, FIG. 18(d) shows a magnetostrictive transducer 181 attached to a lead-in portion 182 which penetrates the pipe wall 185 via a sealed compression fitting 184. Inside the pipe, the lead-in curves and joins a threaded section 183 which is the intended antenna portion. Rays such as ray 186 radiate in a conelike pattern into fluid 187 within the pipe. For higher frequencies, $\geq 1$ MHz, the piezoelectric transducer 188 would be employed.

Figure 19A:
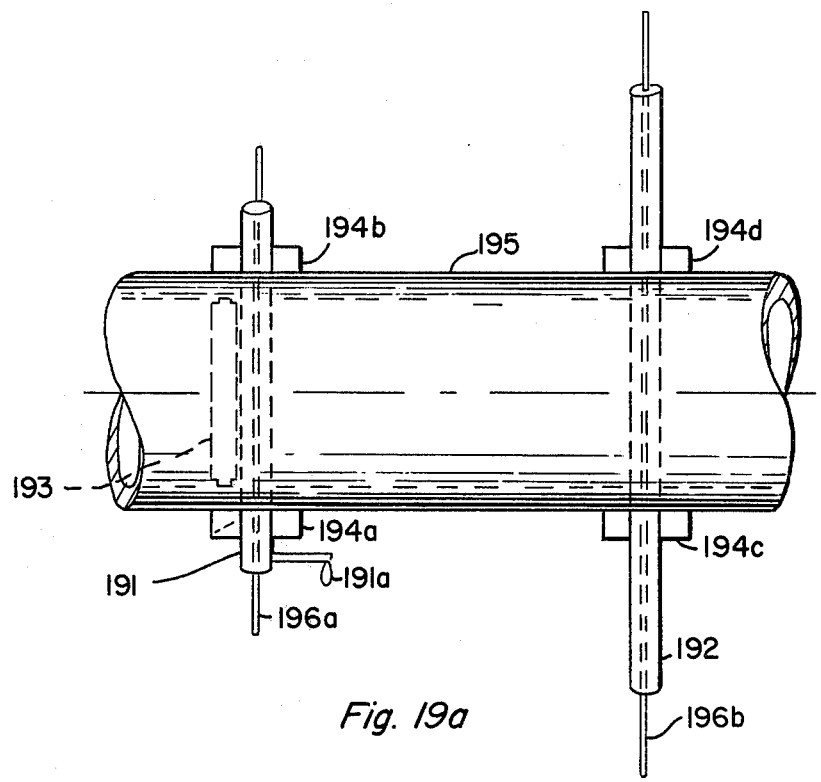
FIG. 19a shows antennas installed in shields which may be cleaned mechanically by their rotary or axial motion, without interrupting operation, and further illustrates a bluff bodied scraper appropriate for shedding vortices which modulate the transmission of ultrasound transmitted in the plane of the wake.
Figure 19B:
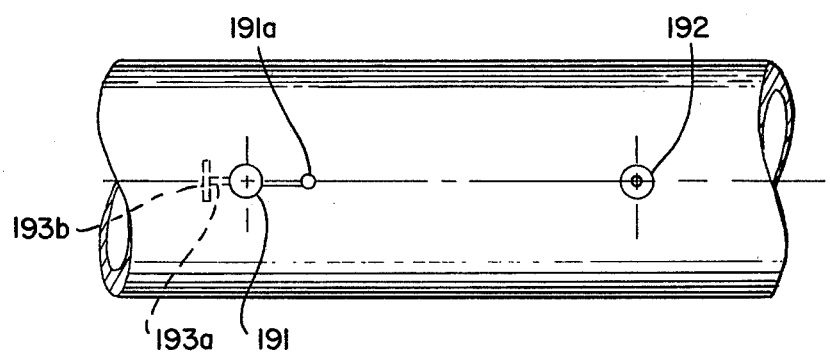
Figure 20A:
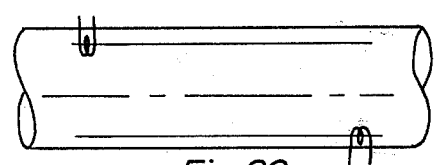
FIG. 20a illustrates identical antennas with transducers at opposite ends.
Figure 20I:
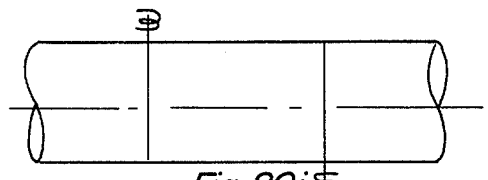
FIG. 20i shows waveguide antennas transverse to the conduit axis.
Figure 20B:
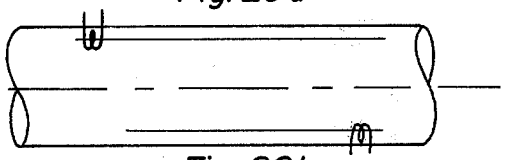
FIG. 20b shows offset antennas.
Figure 20J:
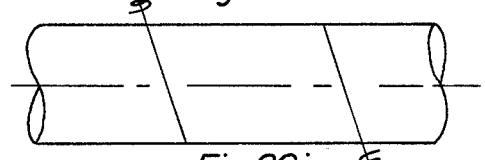
FIG. 20j shows oblique antennas.
Figure 20C:
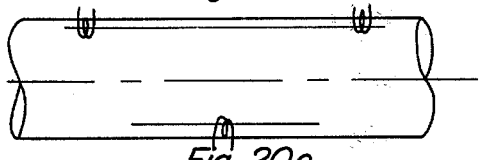
FIG. 20c shows one waveguide antenna shorter than the other.
Figure 20K:
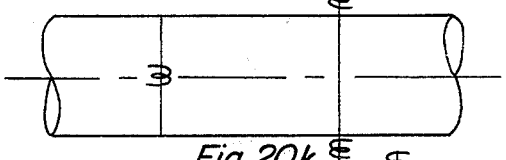
FIG. 20k shows orthogonally oriented antennas with three transducers.
Figure 20D:
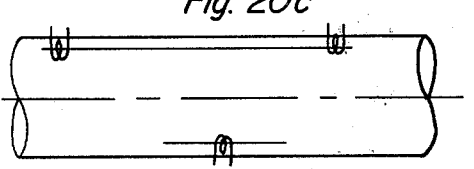
FIG. 20d shows a shorter antenna in an unsymmetrical arrangement.
Figure 20L:
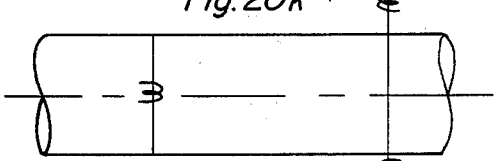
FIG. 20l illustrates the use of three antennas.
Figure 20E:
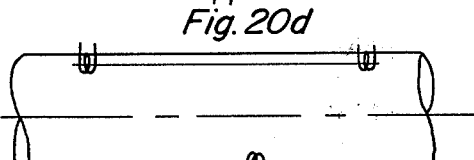
FIG. 20e shows a pair of waveguide antennas in which the transducer is off center on the short antenna.
Figure 20M:
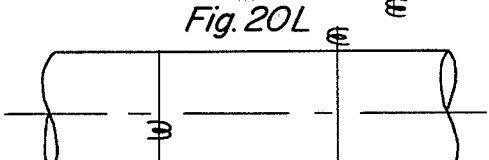
FIG. 20m utilizes three transducers with one transducer off the axis.
Figure 20F:
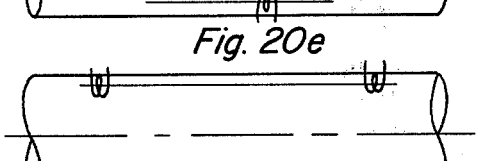
FIG. 20f illustrates two waveguide antennas with four transducers.
Figure 20N:
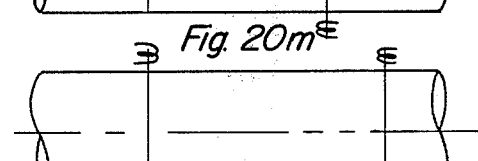
FIG. 20n illustrates the use of four transducers.
Figure 20G:
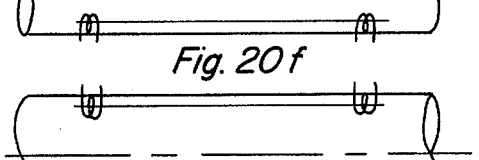
FIG. 20g shows two waveguide antennas with three transducers.
Figure 20O:
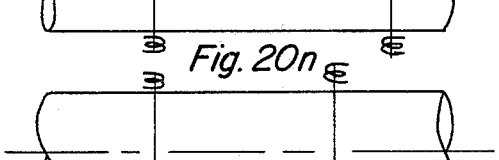
FIG. 20o employs three transducers.
Figure 20H:
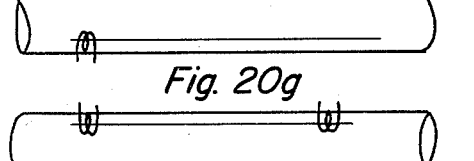
FIG. 20h shows two unequal length waveguide antennas with four transducers.
Figure 20P:
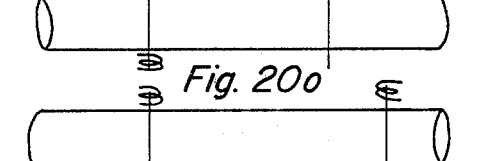
FIG. 20p uses four transducers.

FIG. 19 shows two views of sheathed antennas mounted so as to be scraped clean by mechanical means such as rotary or linear motion of the sheath. To the pipe 195 are mounted bearings 194a–d, which support sheaths 191, 192. Sheath 191 can be rotated within its bearings by crank 191a, scraping the sheath within the pipe against blade 193, in particular, against the blade portion 193a (FIG. 19b). This blade may optionally be stabilized by rib 193b which may also serve as a vortex shedding bluff body. These vortices may help keep the sheaths clean, and they may be used as indicators of the flow velocity. Sheath 192 is scraped clean by drawing it through its sealed bearings 194c, d. Note that either procedure does not require that the antenna itself be removed from service during the cleaning. With respect to the vortex shedding measurements of flow velocity, these are based on principles reviewed by the applicant in the cited Vol. 14, pp. 453-458, and by Schmidt and Tilmann, J. Acoust. Soc. Amer. 47(5) Part 2, 1310-1324 (May 1970), by Schmidt and other authers such as the authors of ref. 1, 2, 3 and 7 cited therein (1954-1963), by Kraemer and Dinkelacker, Vortrag K-5-1, in: Proc. 6th Int'l. Congress on Acoustics, Tokyo (1968), by Klass, Av. Week & Space Techn. 97(19) 43-47 (1972), and by Joy and Colton in their U.S. Pat. No. 3,680,375 (1972). While Joy and Colton do not exclude the possibility of interacting with shed vortices in their plane, they do not show any structure nor provide any explanation of how to interact with shed vortices in their plane and throughout the entire vortex sheet. Their FIG. 11 shows a single transducer 115 which would appear to respond primarily to its own wake, and with decreasing efficiency, to the wake of adjacent portions of the strut in which it is mounted. In the case of swirling two-phase flow of a liquid/gas, we may expect the lower density gas to become concentrated near the axis. If the transducer 115 of Joy and Colton's FIG. 11 happens to be mounted in the path of the gas (bubbles), interrogation may be blocked or modulated in a confusing manner. However, by using the extended source concept achieved with the antennas of the present invention, sensitivity to interruptions of a particular portion of an extended sheetlike path is substantially avoided. In preferred configurations, the antennas are extended so as to interact with an extended portion of the wake's vortex sheets. Accordingly, the obstacle (bluff body shedder) should be sufficiently extended to shed vortex sheets of width w at least ten times the thickness d of the obstacle. The shedder's cross section, particularly dimension d, may be variable over the width W so that the ratio V/d is more nearly constant along W. That is to say, the bluff body may be contoured to compensate at least partly for the expected velocity profile under turbulent flow. Thus, d would have a maximum value on the pipe axis, and smaller values towards the pipe wall.

FIG. 20 summarizes 16 different configurations utilizing 2, 3 or 4 transducers, and antenna pairs oriented parallel or not parallel to the pipe axis. Generally speaking, the not parallel configurations are duals of their counterparts drawn adjacent. Comments on these designs appear in Table 2.

TABLE 2

| | Parallel to pipe axis | Not parallel to pipe axis | Comments |
|---|---|---|---|
| (a) | x | | Antennas identical; transducers at opposite ends |
| (b) | x | | Antennas offset; identical; transducers at opposite ends |
| (c) | x | | One antenna shorter; arrangement symmetrical |
| (d) | x | | One antenna shorter; arrangement not symmetrical |
| (e) | x | | One antenna shorter; transducer not centered on short antenna |
| (f) | x | | Like (a) but 4 transducers |
| (g) | x | | Like (a) but 3 transducers |

TABLE 2-continued

| | Parallel to pipe axis | Not parallel to pipe axis | Comments |
|---|---|---|---|
| (h) | x | | One antenna shorter; 4 transducers at ends |
| (i) | | x | Same comments as (a); antennas orthogonal to axis; transducers external |
| (j) | | x | Antennas oblique |
| (k) | | x | Orthogonal dual of (c) |
| (l) | | x | Orthogonal dual of (d) |
| (m) | | x | Orthogonal dual of (e) |
| (n) | | x | Orthogonal dual of (f) |
| (o) | | x | Orthogonal dual of (g) |
| (p) | | x | Orthogonal dual of (h) |

Figure 21:
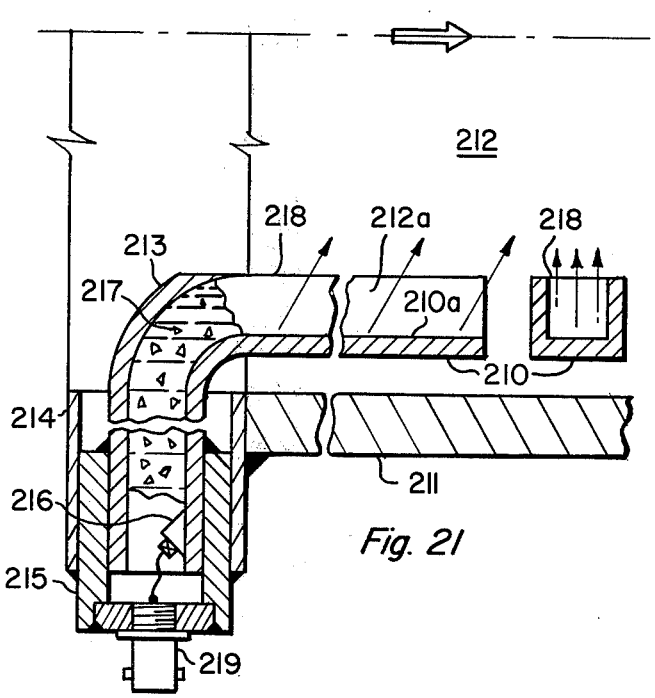
FIG. 21 shows a special use of a square tube, wherein a surface wave launched along an inner surface may be coupled to a fluid adjacent an exposed portion of the inner surface.

FIG. 21 shows a means of interrogating a flowing fluid 212 contained within a flanged pipe section spool-piece, using surfaces waves propagating along the inner surface 210a of an antenna formed from a square tube 210. The pipe 211 is welded to flange 214. Between bolt holes in this flange, a radial hole is bored to accommodate square holed sleeve 215. This sleeve is welded or otherwise sealed to the square tube, to a cap and electrical connector assembly 219, and to the flange. The tube is smoothly bent in region 213 through a 90° arc so that inner surface 210a becomes parallel to the pipe axis. Surface waves may be launched along this inner surface by conventional means such as the wedge and transducer assembly 216. A portion of the square tube between the wedge and where the inner surface becomes parallel to the pipe axis may be filled optionally with an attenuating sealing material 217, to prevent radiation into the fluid except along the predetermined direction indicated by the rays emanating from the antenna surface 210a. Line 218 may represent the absence of the fourth side of the square tube, or it may be interpreted as an acoustically thin shield, in which latter case the liquid 212a adjacent the radiating surface 210a may be different from the flowing fluid 212 in the pipe. (A discussion of leaky surface waves is given by Brower, Humberger and Mayer in IEEE Trans. Sonics and Ultrasonics 26 (4) 306-308, July 1979.)

A flange may provide one of the only practical opportunities for gaining access to the duct's interior without creating a hole through the duct wall itself. (Compare with FIG. 5(e), representing a masonry (e.g. concrete or brick) pipe or subterranean tunnel (as through rock) and for which the illustrated access is a manhole, or, equivalently, a side branch of suitable dimensions.)

Figure 22:
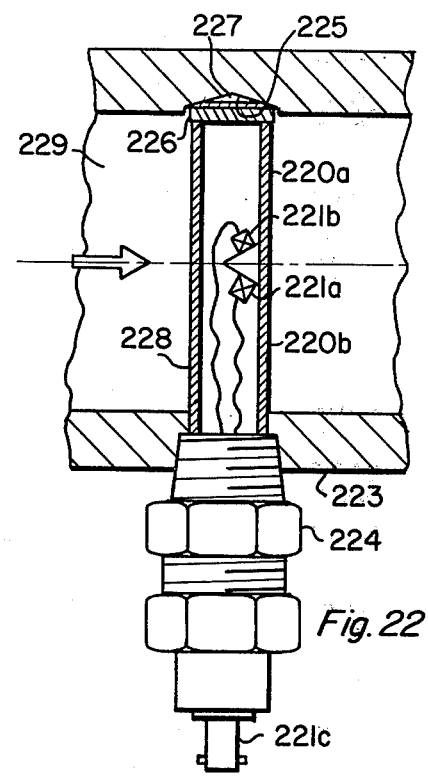
FIG. 22 shows a square tube antenna installed from one side of a pipe section, across a diameter, pressed against but acoustically isolated from the opposite side of the pipe.

FIG. 22 shows a dual transducer Lamb wave antenna installed through a single threaded hole tapped radially in a pipe section 223. Compression fitting 224 holds tube 228 firmly against the hole 225 drilled partly into the opposite wall. To dampen vibration and to prevent unwanted coupling of ultrasound to the pipe wall, an acoustically dissimilar attenuating material 227, typically teflon or other gasket material, may be captured between the end 226 of tube 228 and the hole 225. Tube 228 may be square, or it may be formed of circular tubing which has been flattened along one side, namely, the side containing antenna portions 220a, b. If piezoelectric transducer 221a is energized, Lamb waves will be launched first in antenna portion 220a, radiating rays into the fluid 229 as indicated by the arrows. If undamped, Lamb waves will reflect off the end and radiate additional energy but somewhat later in time. The reason for showing two Lamb wave wedge transducers at the center of tube 228 is to indicate explicity how one may interrogate two sections of fluid within the pipe 223. In this case the electrical connector 221c may be a twinax type, or it may be comprised of a pair of ordinary coaxial connectors, for individual excitation of the two transducers 221a, b.

Figure 23:
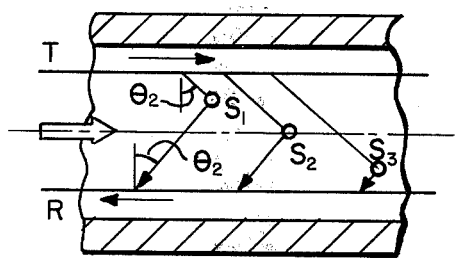
FIG. 23 shows a pair of antennas operated in the doppler (reflection) mode, wherein the frequency of the radiation scattered off scatterers in the fluid is shifted in proportion to the Mach number of the scatterers.

FIG. 23 repesents a pair of antennas interrogating a two phase fluid containing scatterers $S_1, S_2, S_3, \ldots$. In this case Doppler processing of the scattered signals would be used to determine the Mach no. and then the flow velocity. Combinations of range gating and shielding, not shown, may be used if desired to define more precisely the region of fluid which is being interrogated.

Figure 24A:
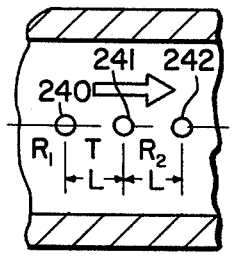
FIGS. 24a and 24b show 3- and 4-antenna configurations suitable for contrapropagating transmission and also correlation measurements of the flow velocity.
Figure 24B:
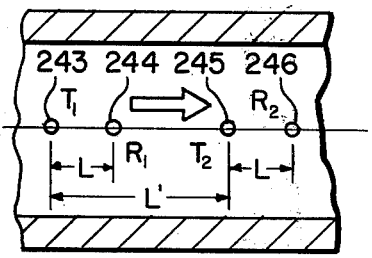

FIG. 24 shows how antennas may be installed along 3 or 4 diameters of a pipe when it is intended to measure flow by contrapropagating transmission and/or correlation methods. (Correlation methods are discussed in the cited Vol. 14, pp. 449–453. For example, the flow velocity may be determined from the time for inhomogeneities which modulate (interrupt) transmission to pass from one measurement region to another (spaced apart) region.) In FIG. 24(a) the transmitter 241 communicates simultaneously with receivers 240, 242 each of which is equidistant from the transmitter. If the flow modulates transmission, $R_2$ will generally begin to receive a given modulated signal at a time L/V after $R_1$ has first received it. L should be between about ½ and 2 pipe diameters. At high Mach numbers, the difference in upstream and downstream travel times may confuse the measurement of correlation time, in which case one may prefer to transmit from 240 to 241 and then from 241 to 242. An alternative is to use two pairs of antennas 243–246 as in FIG. 24(b).

Figure 25:
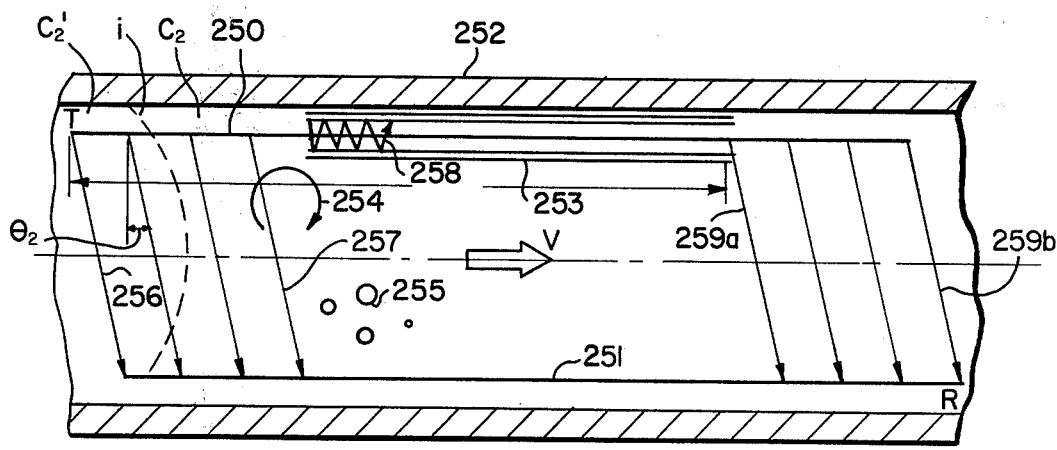
FIG. 25 shows a pair of antennas parallel to the pipe axis, one of which is partly masked so that propagation occurs principally in two separated segments.

FIG. 25 shows another antenna arrangement for measuring flow velocity by a correlation method. Antennas 250, 251 communicate at a relatively small refracted angle $\theta_2$ over the unmasked paths 256–257, and 259a–b. Mask 253 separates the antennas effectively into two areas spaced L apart. L should preferably be between ½ and 2 pipe diameters. The mask may consist of a pair of concentric tubes which are acoustically isolated from each other by gasketing or a vacuum or gas gap. Therefore a trapped ray like 258 cannot radiate into the fluid within pipe 252. Transmission from T to R, or to R', will be modulated twice by inhomogeneities such as eddies 254, gas bubbles or other scatterers 255, or by the passage of an interface i between two liquids of differing sound speeds $c_2, c_2'$ or differing attenuation coefficients $\alpha_2, \alpha_2'$. Again, the time between the first and second correlated modulation will be L/V, from which V can be determined.

In the above discussion, $c_2$ and $c_2'$ will be understood to represent essentially the average speed of sound (more rigorously termed the "harmonic mean" speed of sound) in the fluid lying in the interrogation path generally between a pair of antennas. $c_1$ in the waveguide may be thought of as the "average" speed at the center frequency of the interrogating spectrum. For dispersive modes (e.g., Lamb, flexural) a narrow spectrum would be preferred, to minimize pulse smearing or other dispersion effects. Here, one often prefers to design the combination of wave type, antenna structure and interrogating spectrum so that at least 90% of the energy in the interrogating wave propagates in each antenna at a velocity within 5% of the velocity at the center frequency of that spectrum.

FIG. 26 shows a pair of waveguide segments 262a, b joined at their ends to form a continuous loop having two parallel portions aligned with the flow velocity vector V, and two curved portions. First we shall consider the situation where the transducer means 260 is exactly centered. Following the initial pulse, waves such as 264a, b are launched, interrogating the flowing fluid upstream and downstream in regions generally left and right of the centerline, respectively. If the flow velocity V=0, these two interrogating rays, and all others of equivalent paths, arrive simultaneously, forming the summation pulse 265 as shown in the timing diagram beneath the loop. For V≠0, say V=3 m/s, path 264a takes longer to negotiate, and path 264b takes less time. Hence the received pulse 266, instead of having a minimum pulse width $t_p$, has an increased pulse width $t_p + \Delta t$. If the flow is large enough and the parallel portions of the loop are far enough apart, the received pulse will actually break up into two separate segments, each of about half the amplitude of the pulse received at no flow.

To make it easier to measure $\Delta t$ at low flow velocities it is convenient to offset the position of the transducer by a distance x; this is indicated by the alternative position shown for transducer 261. Small reflectors 263a b may be placed equidistant from the centerline to generate echoes from which the offset distance x may be obtained. Now if transducer 261 is energized, the no-flow received pulses denoted 267a, b arrive separately, separated in time by an interval 4 $x/c_1$ where $c_1$ = sound speed in the waveguide. Under flow, say V= −3 m/s, the received pulses are each shifted by an amount $\Delta t/2$, the total separation increasing to 4 $x/c_1 + \Delta t$. Waves such as 264c, d that travel all around the loop clockwise or counterclockwise arrive together to form pulse 269.

The loop shown may be constructed entirely of a magnetostrictive rod encircled by a coil as shown. However the onetransducer, continuous-loop concept does not depend on this particular arrangement; a piezoelectric transducer and waveguide may be used in analogous fashion.

By extending the loop flowmeter concept to a multi-level multiple loop configuration, the arrived times of earliest arriving pulse pairs can be interpreted in terms of V, as just described, as well as in terms of liquid level H. Stepwise interpretation of H is illustrated by the applicant in FIG. 3c in the cited paper in the 1979 Ultrasonics Symp. Proc., IEEE Cat. #79CH1482-9SU (1979).

In ultrasonic contrapropagating transmission flowmeters it is often desirable to interrogate in upstream and downstream directions as nearly simultaneously as possible, between a given pair of transducers, over a common path. However, transducers generally ring, preventing a transmitting transducer from being used as a receiver prior to the end of ringdown. If ringdown ends in a time interval shorter than the time of flight, then simultaneous launching from a pair of opposed transducers, or antennas, may be practical.

A second problem encountered when simultaneous launching is used, is that the flow velocity may be inadequate to clearly separate the upstream and downstream received pulses. For example, at no flow, V=0, and the upstream and downstream interrogating pulses essentially arrive simultaneously, completely overlapping one another (FIG. 27a). When V is small, $\Delta t$ likewise will be relatively small. Consider the case where $\Delta t$ is less than the pulse width. The partly overlapped received signals A(t) of FIG. 27b represent this case, which is equivalent to smeared pulse 266 in FIG. 26.

Now, however, instead of sensing the increased pulse width $t_p + \Delta t$, we indicate in FIG. 27b the process of electronically obtaining the time derivative of the received waveform, and measuring $\Delta t$ between selected zero crossings of the derived waveform. Not shown, one can additionally produce $A^2$ or $A^4$ first, and then differentiate, to increase the magnitude of the slewing rate of the derived pulse in the vicinity of the zero crossing. Measurement of the time interval between the derived zero crossings may use conventional digital clock and timing methods, for example, averaging of 10, 100 or 1000 interrogations, each interval having been timed with a suitably high frequency clock, perhaps 100 MHz for 1 ns resolution. Analogous timing has been described in the field of ultrasonic thermometry by H.A. Tasman in his paper in the cited Proceedings of the 1979 IEEE Ultrasonics Symposium, pp. 380–383.

In measuring the flow in partly-filled conduits or in open channels it is sometimes necessary to measure the flow velocity at a particular fractional level. For example, an article in Ultrasonics 18(1) 6–7 (January 1980), stated that "with partially filled pipes or channels of a variety of shapes, including rectangular and elliptical, research has shown that measuring the velocity at 30% of the full height, together with a knowledge of the actual level, gives a better than 3% accuracy of flow measurement." (Other research, however, supports the selection of different fractional height, e.g., 20% of the full height). Accordingly, we show in FIG. 28 a parallelogram configuration which maintains a horizontal-axis waveguide antenna at an adjustable but predetermined fraction (e.g., 30%) of the distance between an anchored pivot and a float. In FIG. 28, the channel bottom or bed 306 provides a base to which anchored pivots 303a, 303b are related. Side arms 301a, 301b are linked to the anchored pivots and to adjustable pivots 302a, 302b which also maintain antenna 300 parallel to a line through the anchored pivots. Float 304 follows the rise and fall of the liquid level. Thus, the antenna's depth is maintained at a fraction of H, i.e., $H_1 H = \overline{AC}/\overline{FC}$. The value of $H_1$ may be determined in several ways, such as by measuring the time of flight from transducer 305 to the channel bottom or to the top of the liquid, as indicated by the dashed arrow paths. According to the cited Ultrasonics article (January 1980) the pivots 302a, 302b would be adjusted so $\overline{BD} = \overline{AC} = 0.3 \overline{FC}$. However, other fractional heights could be interrogated, including more than one level to obtain a better average. Conventional means to clean, flush or otherwise prevent clogging or fouling of the mechanism are not shown.

It is thus seen that the objects of this invention have been achieved in that there has been disclosed ultrasonic flowmeters employing waveguide antennas which are inexpensive and reliable and which are operable in high temperature fluids. The use of waveguide antennas allows accurate flow measurement in the presence of multiphase fluids and when in contact with liquids which tend to coat the antennas with residues. In addition, such flowmeters substantially eliminate errors arising from non-axial components of fluid flow.

What is claimed is:

1. Apparatus for measuring the flow velocity of a fluid comprising:
    at least one pair of spaced apart, elongated waveguide antennas for propagating ultrasonic waves, each antenna containing at least one segment immersed in said fluid, and wherein at least one immersed segment in each of said antennas lies in a plane which is substantially parallel to the flow velocity vector of said fluid;
    first transducer means for launching an ultrasonic wave at a first time along one of said waveguide antennas for transmission through said fluid;
    second transducer means for detecting at a second time said ultrasonic wave received in another of said waveguide antennas; and
    processing means operating on said received ultrasonic wave for computing the flow velocity of said fluid.

2. The apparatus of claim 1 wherein said first and said second transducers are adapted both for launching and detecting said ultrasonic wave.

3. The apparatus of claim 2 wherein said fluid is interrogated both in an upstream and a downstream direction by transposing the functions of said first and second transducer means.

4. The apparatus of claim 1 wherein said waveguide antennas are of substantially identical length.

5. The apparatus of claim 1 wherein said waveguide antennas are of different effective lengths so that upstream and downstream interrogations of said fluid can be performed without transposing the functions of said first and second transducer means.

6. The apparatus of claim 5 wherein said first transducer means and said second transducer means are located at the same ends of said waveguide antennas.

7. The apparatus of claim 4 wherein one of said antennas is displaced axially from another of said antennas by a distance L approximately equal to $D \tan \theta_2$ wherein D is the distance between said waveguide antennas and $$\theta_2 = \sin^{-1}\left(\frac{c_2}{c_1}\right)$$

where $c_2$ is the velocity of said ultrasonic wave in said fluid and $c_1$ is the velocity of said ultrasonic wave in said waveguide antennas.

8. The apparatus of claim 1 wherein said waveguide antennas are supported by compression fittings mounted in the wall of the conduit in which said fluid flows.

9. The apparatus of claim 1 wherein the length of each waveguide antenna is at least equal to the diameter of the conduit in which said fluid flows.

10. The apparatus of claim 1 wherein said waveguide antennas are mounted in recesses in the conduit in which said fluid flows.

11. The apparatus of claim 10 wherein said antennas are shielded from said fluid.

12. The apparatus of claim 1 wherein the plane defined by said immersed segments in said antennas is chosen such that the average flow velocity of said fluid in said plane is substantially equal to the area averaged flow velocity of said fluid.

13. The apparatus of claim 1 wherein said transducers are magnetostrictive.

14. The apparatus of claim 1 wherein said transducers are piezoelectric.

15. The apparatus of claim 1 wherein said antennas are shielded by shields which surround at least a portion of said antennas.

16. The apparatus of claim 15 wherein said shields are preferentially transmissive in the path between said antennas.

17. The apparatus of claim 15 wherein said shields are stiffened by structural members.

18. The apparatus of claim 15 wherein said shield includes a bluff surface.

19. The apparatus of claim 1 wherein said antennas are installed in a vertical plane in a conduit in which said fluid only partly fills said conduit.

20. The apparatus of claim 1 wherein said antennas are adapted for supporting at least one of the following ultrasonic waves: longitudinal, shear, Rayleigh (surface), Lamb, extensional, torsional, flexural.

21. The apparatus of claim 15 wherein said shields are heated to a temperature sufficient to remove deposits from the surface of said shields.

22. The apparatus of claim 21 wherein said shields are heated by electrical resistance means.

23. The apparatus of claim 15 further including cleaning means disposed in contact with said shields, said shields mounted for rotation about their axes thereby to clean said shields.

24. The apparatus of claim 15 wherein said shields are supported in closely fitting bearings, said shields adapted for axial motion through said bearings, said motion cooperating with said bearings to clean said shields.

25. The apparatus of claim 1 wherein the surfaces of said antennas are threaded.

26. The apparatus of claim 1 wherein at least one portion of said antenna is masked to provide two spaced apart measurement regions.

27. The apparatus of claim 1 further including a bluff body obstacle immersed in said fluid and adapted for shedding a sheet of vortices generally parallel to said plane defined by said antennas and at a frequency proportional to flow velocity, said vortex sheet having a width at least ten times greater than the thickness of said obstacle, said vortices modulating said ultrasonic wave.

28. The apparatus of claim 1 wherein said antennas are monolithic.

29. The apparatus of claim 1 including at least two pairs of said antennas disposed within said fluid so that the velocities measured by each said pair of antennas can be weighted by conventional quadrature techniques to produce a weighted average substantially equal to the area average flow velocity of said fluid.

30. The apparatus of claim 20 wherein the combination of wave type, antenna structure and interrogating spectrum are chosen so that at least 90% of the energy in the interrogating wave propagates in each antenna at a velocity within 5% of the velocity at the center frequency of said spectrum.

31. Apparatus as in claim 1 wherein said fluid is confined to a rigid duct and wherein access for the installation of said antennas is limited to one of the following: manhole, side branch, flange.

32. Apparatus as in claim 31 wherein said duct is a masonry pipe.

33. Apparatus as in claim 31 wherein said duct is a subterranean tunnel.

34. Apparatus as in claim 2 wherein said spaced apart antennas are linked by waveguide.

35. Apparatus as in claim 34 wherein said first and second transducers comprise a single transduction means.

36. The apparatus of claim 26 wherein the flow is determined from the time for inhomogeneities which interrupt transmission to pass from one of said spaced apart measurement regions to another.

37. The apparatus of claim 1 wherein each antenna contains at least two orthogonal segments.

38. The apparatus of claim 37 wherein each antenna can be rotated until at least one of its segments lies in a plane which is parallel to the flow velocity vector.

39. The apparatus of claim 1 additionally including reflecting means so that the main lobe of the reflected beam, defined by its 3 dB points, lies within five degrees of the plane containing the corresponding antenna segments.

40. Apparatus as in claim 1 wherein at least one segment in each antenna has a length of at least 100 wavelengths, said wavelengths being measured in the fluid at the center frequency of the spectrum of the interrogating wave.

41. Apparatus as in claim 37 wherein two orthogonal segments in each antenna each have a length of at least 100 wavelengths, said wavelengths being measured in the fluid at the center frequency of the interrogating spectrum.

42. The apparatus of claim 1 wherein the transit time in a predetermined portion of one of said antennas provides a measure of the temperature of said fluid adjacent said antenna.

43. The apparatus of claim 42 wherein said temperature is determined from the transit time of extensional guided waves, and where the transit time of torsional waves in said predetermined portion provides a measure of the level of the liquid adjacent said antenna.

44. The apparatus of claim 43 wherein the average transit time of longitudinal waves transmitted between said antennas in said fluid provides a measure of the composition of said fluid.

* * * * *

UNITED STATES PATENT AND TRADEMARK OFFICE
CERTIFICATE OF CORRECTION

PATENT NO. : 4,336,719
DATED : June 29, 1982
INVENTOR(S) : Lawrence C. Lynnworth It is certified that error appears in the above-identified patent and that said Letters Patent are hereby corrected as shown below:

Col. 13, line 61, "$L_a 22$ D, or $L_a > 100$" should read --$L_a > D$, or $L_a > 100$--.

Col. 22, line 19, "surfaces" should read --surface--.

Signed and Sealed this

Fourteenth Day of December 1982

[SEAL]

Attest:

GERALD J. MOSSINGHOFF

Attesting Officer     Commissioner of Patents and Trademarks